US006528759B2

(12) United States Patent
Garcia et al.

(10) Patent No.: US 6,528,759 B2
(45) Date of Patent: Mar. 4, 2003

(54) PNEUMATIC INDUCTOR AND METHOD OF ELECTRICAL CONNECTOR DELIVERY AND ORGANIZATION

(75) Inventors: Steven E. Garcia, Colorado Springs, CO (US); James A. Harden, Jr., Colorado Springs, CO (US); David A. Hofmann, Colorado Springs, CO (US)

(73) Assignee: Medallion Technology, LLC, Houston, TX (US)

( * ) Notice: Subject to any disclaimer, the term of this patent is extended or adjusted under 35 U.S.C. 154(b) by 0 days.

(21) Appl. No.: 09/780,981

(22) Filed: Feb. 13, 2001

(65) Prior Publication Data

US 2002/0108934 A1 Aug. 15, 2002

(51) Int. Cl.⁷ .............................................. B23K 26/00
(52) U.S. Cl. .............................. 219/121.72; 219/121.65
(58) Field of Search ........................ 219/121.72, 121.65; 228/4.1; 229/884

(56) References Cited

U.S. PATENT DOCUMENTS

| | | | |
|---|---|---|---|
| 2,064,545 A | 12/1936 | Kleinmann et al. | |
| 2,752,580 A | 6/1956 | Shewmaker | |
| 3,017,605 A | 1/1962 | Platz et al. | |
| RE25,798 E | 6/1965 | Platz et al. | |
| 3,205,469 A | 9/1965 | Frank et al. | |
| 3,255,430 A | 6/1966 | Phillips | |
| 3,258,736 A | 6/1966 | Crawford et al. | |
| 3,277,560 A | 10/1966 | Frank et al. | |
| 3,319,217 A | 5/1967 | Phillips | |
| 3,333,225 A | 7/1967 | McNutt | |
| 3,400,358 A | 9/1968 | Byrnes et al. | |
| 3,402,466 A | 9/1968 | Phillips | |
| 3,696,229 A | * 10/1972 | Angelucci et al. | 219/85 |
| 4,076,356 A | 2/1978 | Tamburro | |
| 4,312,125 A | * 1/1982 | Waghorn | 29/884 |
| 4,357,742 A | * 11/1982 | Fischer et al. | 29/33 M |
| 4,358,180 A | 11/1982 | Lincoln | |
| 4,505,529 A | 3/1985 | Barkus | |
| 4,773,877 A | 9/1988 | Krüger et al. | |
| 4,843,315 A | 6/1989 | Bayer et al. | |
| 4,889,496 A | 12/1989 | Neidich | |
| 4,911,645 A | 3/1990 | August et al. | |
| 5,014,419 A | 5/1991 | Cray et al. | |
| 5,050,295 A | 9/1991 | Sullivan et al. | |
| 5,051,108 A | 9/1991 | Lincoln | |
| 5,054,192 A | 10/1991 | Cray et al. | |
| 5,106,310 A | 4/1992 | Krajewski et al. | |
| 5,112,232 A | 5/1992 | Cray et al. | |
| 5,129,830 A | 7/1992 | Krajewski et al. | |
| RE34,084 E | 9/1992 | Noschese | |
| 5,388,998 A | 2/1995 | Grange et al. | |
| 5,667,410 A | 9/1997 | Johnston | |
| 6,043,666 A | 3/2000 | Kazama | |

FOREIGN PATENT DOCUMENTS

| | | |
|---|---|---|
| JP | 55133549 | 10/1980 |
| JP | 55133550 | 10/1980 |
| JP | 568837 | 1/1981 |
| JP | 63208237 | 8/1988 |
| JP | 63293845 | 11/1988 |
| JP | 3209173 | 9/1991 |
| JP | 3209174 | 9/1991 |

* cited by examiner

Primary Examiner—M. Alexandra Elve
(74) Attorney, Agent, or Firm—John R. Ley

(57) ABSTRACT

A segment of wire from which an electrical connector has been fabricated is conveyed from a point where the electrical connector wire segment is severed from a length of remaining wire into a receptacle within which the electrical connector wire segment is stored until use. A reduced pressure is applied by a venturi assembly to the wire segment, and a gas flow conveys the wire segment to the receptacle. A cassette defines the receptacles, and the cassette is repeatedly positioned to each newly fabricated wire segment in a different receptacle.

40 Claims, 10 Drawing Sheets

PNEUMATIC INDUCTOR AND METHOD OF ELECTRICAL CONNECTOR DELIVERY AND ORGANIZATION

CROSS-REFERENCE TO RELATED INVENTIONS

This invention is related to inventions for High-Speed, High-Capacity Twist Pin Connector Fabricating Machine and Method, Wire Feed Mechanism and Method Used for Fabricating Electrical Connectors, and Rotational Grip Twist Machine and Method for Fabricating Bulges of Twisted Wire Electrical Connectors, described in the concurrently-filed U.S. patent applications Ser. Nos. 190326; 190.327; and 190.328, respectively, all of which are assigned to the assignee hereof, and all of which have at least one common inventor with the present application. The disclosures of these concurrently filed applications are incorporated herein by this reference.

FIELD OF THE INVENTION

This invention generally relates to the fabrication of electrical interconnectors used to electrically connect printed circuit boards and other electrical components in a vertical or z-axis direction to form three-dimensional electronic modules. More particularly, the present invention relates to a new and improved machine and method for fabricating z-axis interconnectors of the type formed from helically coiled strands of wire, in which at least one longitudinal segment of the coiled strands is untwisted in an anti-helical direction to expand the strands of wire into a resilient bulge. Bulges of the interconnector are then inserted into vias of vertically stacked printed circuit boards to establish an electrical connection through the z-axis interconnector between the printed circuit boards of the three dimensional module.

BACKGROUND OF THE INVENTION

The evolution of computer and electronic systems has demanded ever-increasing levels of performance. In most regards, the increased performance has been achieved by electronic components of ever-decreasing physical size. The diminished size itself has been responsible for some level of increased performance because of the reduced lengths of the paths through which the signals must travel between separate components of the systems. Reduced length signal paths allow the electronic components to switch at higher frequencies and reduce the latency of the signal conduction through relatively longer paths. One technique of reducing the size of the electronic components is to condense or diminish the space between the electronic components. Diminished size also allows more components to be included in a system, which is another technique of achieving increased performance because of the increased number of components.

One particularly effective approach to condensing the size between electronic components is to attach multiple semiconductor integrated circuits or "chips" on printed circuit boards, and then stack multiple printed circuit boards to form a three-dimensional configuration or module. Electrical interconnectors are then extended vertically, in the z-axis dimension, between the printed circuit boards which are oriented in the horizontal x-axis and y-axis dimensions. The z-axis interconnectors, in conjunction with conductor traces of each printed circuit board, connect the chips of the module with short signal paths for efficient functionality. The relatively high concentration of chips, which are connected by the three-dimensional, relatively short length signal paths, are capable of achieving very high levels of functionality.

The vertical electrical connections between the stacked printed circuit boards are established by using z-axis interconnectors. Z-axis interconnectors contact and extend through plated through holes or "vias" formed in each of the printed circuit boards. The chips of each printed circuit board are connected to the vias by conductor traces formed on or within each printed circuit board. The vias are formed in each individual printed circuit board of the three-dimensional modules at the same locations, so that when the printed circuit boards are stacked in the three-dimensional module, the vias of all of the printed circuit boards are aligned vertically in the z-axis. The z-axis interconnectors are then inserted vertically throughs the aligned vias to establish an electrical contact and connection between the vertically oriented vias of each module.

Because of differences between the individual chips on each printed circuit board and the necessity to electrically interconnect to the chips of each module in a three-dimensional sense, it is not always required that the z-axis interconnectors electrically connect to the vias of each printed circuit board. Instead, those vias on those circuit boards for which no electrical connection is desired are not connected to the traces of that printed circuit board. In other words, the via is formed but not connected to any of the components on that printed circuit board. When the z-axis interconnector is inserted through such a via, a mechanical connection is established, but no electrical connection to the other components of the printed circuit board is made. Alternatively, each of the z-axis interconnectors may have the capability of selectively contacting or not contacting each via through which the interconnector extends. Not contacting a via results in no electrical connection at that via. Of course, no mechanical connection exists at that via either, in this example.

A number of different types of z-axis interconnectors have been proposed. One particularly advantageous type of z-axis interconnector is known as a "twist pin." Twist pin z-axis interconnectors are described in U.S. Pat. Nos. 5,014,419, 5,064,192, and 5,112,232, all of which are assigned to the assignee hereof.

An example of a prior art twist pin 50 is shown in FIG. 1. The twist pin 50 is formed from a length of wire 52 which has been formed conventionally by helically coiling a number of outer strands 54 around a center core strand 56 in a planetary manner, as shown in FIG. 2. At selected positions along the length of the wire 52, a bulge 58 is formed by untwisting the outer strands 54 in a reverse or anti-helical direction. As a result of untwisting the strands 54 in the anti-helical direction, the space consumed by the outer strands 54 increases, causing the outer strands 54 to bend or expand outward from the center strand 56 and create a larger diameter for the bulge 58 than the diameter of the regular stranded wire 52. The laterally outward extent of the bulge 58 is illustrated in FIG. 3, compared to FIG. 2.

The strands 54 and 56 of the wire 52 are preferably formed from beryllium copper. The beryllium copper provides necessary mechanical characteristics to maintain the shape of the wire in the stranded configuration, to allow the outer strands 54 to bend outward at each bulge 58 when untwisted, and to cause the bulges 58 to apply resilient radial contact force on the vias of the printed circuit boards. To facilitate and enhance these mechanical properties, the twist pin will typically be heat treated after it has been fabricated. Heat treating anneals or hardens the beryllium copper slightly and tempers the strands 54 at the bulges 58, causing enhanced resiliency or spring-like characteristics. It is also typical to plate the fabricated twist pin with an outer coating of gold. The gold plating establishes a good electrical connection with the vias. To cause the gold-plated exterior coating to adhere to the twist pin 50, usually the beryllium copper is first plated with a layer of nickel, and the gold is plated on top of the nickel layer. The nickel layer adheres very well to the beryllium copper, and the gold adheres very well to the nickel.

The bulges 58 are positioned at selected predetermined distances along the length of the wire 52 to contact the vias 60 in printed circuit boards 62 of a three-dimensional module 64, as shown in FIG. 4. Contact of the bulge 58 with the vias 60 is established by pulling the twist pin 50 through an aligned vertical column of vias 60 in the module 64. The outer strands 54 of the wire 52 have sufficient resiliency when deflected into the outward protruding bulge 58, to resiliently press against an inner surface of a sidewall 66 of each via 60, and thereby establish the electrical connection between the twist pin 50 and the via 60, as shown in FIG. 5. In those circumstances where an electrical connection is not desired between the twist pin 50 and the components of a printed circuit board, the via 60 is formed but no conductive traces connect the via to the other components of the printed circuit board. One such via 60' is shown in FIG. 4. The sidewall 66 of the via 60' extends through the printed circuit board, but the via 60' is electrically isolated from the other components on that printed circuit board because no traces extend beyond the sidewall 66. Inserting a bulge 58 of the twist pin 50 into a via 60' that is not connected to the other components of a printed circuit board eliminates an electrical contraction from that twist pin to that printer circuit board, but establishes a mechanical connection between the twist pin and the printed circuit board which helps support and hold the printed circuit board in the three-dimensional module.

To insert the twist pins 50 into the vertically aligned vias 60 of the module 64 with the bulges 58 contacting the inner surfaces 66 of the vias 60, a leader 68 of the regularly-coiled strands 54 and 56 extends at one end of the twist pin 50. The strands 54 and 56 at a terminal end 70 of the leader 68 have been welded or fused together to form a rounded end configuration 70 to facilitate insertion of the twist pin 50 through the column of vertically aligned vias. The leader 68 is of sufficient length to extend through all of the vertically aligned vias 60 of the assembled stacked printed circuit boards 62, before the first bulge 58 makes contact with the outermost via 60 of the outermost printed circuit board 62. The leader 68 is gripped and the twist pin 50 is pulled through the vertically aligned vias 60 until the bulges 58 are aligned and in contact with the vias 60 of the stacked printed circuit boards. To position the bulges in contact with the vertically aligned vias, the leading bulges 58 will be pulled into and out of some of the vertically aligned vias until the twist pin 50 arrives at its final desired location. The resiliency of the strands 54 allow the bulges 58 to move in and out of the vias without losing their ability to make sound electrical contact with the sidewall of the final desired via into which the bulges 58 are positioned. Once appropriately positioned, the leader 68 is cut off so that the finished length of the twist pin 50 is approximately at the same level or slightly beyond the outer surface of the outer printed circuit board of the module 64. A tail 72 at the other end of the twist pin 50 extends a shorter distance beyond the last bulge 58. The strands 54 and 56 at an end 74 of the tail 72 are also fused together. The length of the tail 72 positions the end 74 at a similar position to the location where the leader 68 was cut on the opposite side of the module. However, if desired, the length of the tail 72 or the remaining length of the leader 68 after it was cut may be made longer or shorter. Allowing the tail 72 and the remaining portion of the leader 68 to extend slightly beyond the outer printed circuit boards 62 of the module 64 facilitates gripping the twist pin 50 when removing it from the module 64 to repair or replace any defective components. In those circumstances where it is preferred that the ends of the twist pin do not extend beyond the outside edges of the three-dimensional module, an overlay may be attached to the outermost printed circuit boards to make the ends of the twist pin flush with the overlay.

The ability to achieve good electrical connections between the vias 60 of the printed circuit boards depends on the ability to precisely position the location of the bulges 58 along the length of wire 52. Otherwise, the bulges 58 would be misaligned relative to the position of the vias, and possibly not create an adequate electrical connection. Therefore, it is important in the formation of the twist pins 50 that the bulges 58 be separated by predetermined intervals 76 (FIG. 1) along the length of the wire 52. The position of the bulges 58 and the length of the intervals 76 depend on the desired spacing between the printed circuit boards 62 of the module 64. The amount of bending of each of the outer conductors 54 at each bulge 58 must also be controlled so that each of the bulges 58 exercises enough force to make good electrical contact with the vias. Moreover, the amount of outward deflection or bulging of each of the bulges 58 must be approximately uniform so that none of the bulges 58 experiences permanent deformation when the bulge is pulled through the vias. Distortion-induced disparities in the dimensions of the bulges adversely affect their ability to make sound electrical connections with the vias 60. Further still, each twist pin 50 should retain a coaxial configuration along its length without slight angular bends at each bulge and without any bulge having asymmetrical characteristics. The coaxial configuration facilitates inserting the twist pin through the vertically aligned vias, maintaining the resiliency of the bulges, and establishing good electrical contact with the vias.

The requirements for close tolerances and precision in the twist pins are made more significant upon recognizing the very small size of the twist pins. The typical sizes of the most common sizes of helically-coiled wire are about 0.0016, 0.0033 and 0.0050 in. in diameter. The diameters of the strands 54 and 56 used in forming these three sizes of wires are 0.005, 0.0010, and 0.0015 in., respectively. The typical length of a twist pin having four to six bulges which extends through four to six printed circuit boards will be about 1 to 1.5 inches. The outer diameter of each bulge 58 will be approximately two to three times the diameter of the regularly stranded wire in the intervals 76. The tolerance for locating the bulges 58 between intervals 76 is in the neighborhood of 0.002 in. The weight of a typical four-bulge twist pin is about 0.0077 grams, making it so light that handling the twist pin is very difficult. Handling each twist pin is also complicated because its small dimensions do not easily resist the forces that are necessary to manually manipulate the twist pin without bending or deforming it. It is not unusual that a complex 4 in.×4 in. module 64 may require the use of as many as 22,000 twist pins. Thus, the relatively large number of twist pins necessary to assemble each three-dimensional module require an ability to fabricate a relatively large number of the twist pins in an efficient and rapid manner.

A general technique for fabricating twist pins is described in the three previously-identified U.S. patents. That described technique involves advancing the length of the stranded wire, clamping the stranded wire above and below the location where the bulge is to be formed, fusing the outer strands of the wire to the core strand of the wire preferably by laser welding at the locations above and below the bulge, and rotating the wire between the two clamps in an anti-helical direction to form the bulge.

In a prior art implementation of this twist pin fabrication technique, a wire feeder advanced an end of the helically stranded wire which was wound on a spool. The wire feeder employed a lead screw mechanism driven by an electric motor to advance the wire and unwind it from the spool. A solenoid-controlled clamp was connected to the lead screw mechanism to grip the wire as the lead screw mechanism advanced as much of the stranded wire from the spool as was necessary for use at each stage of fabrication of the twist pin. To advance more wire, the clamp opened and the lead screw mechanism retracted in a reverse movement. The clamp then closed again on the wire and the electric motor again advanced the lead screw mechanism.

While this prior art wire feeder mechanism was functional, the reciprocating movement of the feeder mechanism reduced efficiency and slowed the speed of operation. Half of the reciprocating movement, the return movement to the beginning position, was wasted motion. Moreover, the relatively high inertia and mass of the lead screw, clamp and motor armature required extra force and hence time to execute the reversing movements necessary for reciprocation. Furthermore, the rotational mass of the wire wound on the spool limited the acceleration rate at which the lead screw could unwind the wire off of the spool. The rotational mass was frequently sufficient enough to cause the wire to slip in the clamp carried by the lead screw. Slippage at this location resulted in the formation of the bulges at incorrect positions and incorrect lengths of the leader 68 and the internal lengths 76. The desire to avoid slippage also limited the operating speed of the fabricating equipment.

The prior art bulge forming mechanism included two clamping devices which closed on the wire above and below at the location where each bulge was to be formed. The clamping devices held a wire while a laser beam fused the outer strands 54 to the center core strand 56 at those locations. Thereafter, the lower clamping device was rotated in an anti-helical direction while the upper clamping device held the wire stationary, thereby forming the bulge 58.

The lower clamping device was carried by a sprocket, and the wire extended through a bole in the center of the sprocket. A first pneumatic cylinder was connected to the clamping device to cause the clamping device to grip the wire. A chain extended around the sprocket and meshed with the teeth of the sprocket. One end of the chain was connected to a spring, and the other end of the chain was connected to a second pneumatic cylinder. When the second pneumatic cylinder was actuated, its rod and piston pulled the chain to rotate the sprocket by the amount of the piston throw. Upon reaching the end of its throw, the rod and cylinder of the second pneumatic cylinder was returned in the opposite direction to its original position by the force of the spring which pulled the chain in the opposite direction. Of course, moving the chain to its original position also rotated the sprocket in the opposite direction to its original position.

After gripping the wire by activating the first pneumatic cylinder, the second pneumatic cylinder was activated to rotate the sprocket in the anti-helical direction. However, the throw of the second pneumatic cylinder, and the amount of rotation of the sprocket, was insufficient to completely form a bulge with a single rotational movement. Instead, two of separate rotational movements were required to completely form the bulge. After the rotation, the lower clamping device released its grip on the wire while the sprocket rotated in the reverse direction. Upon rotating back to the initial position again, the lower clamping device again gripped the wire and another rotational movement of the sprocket and gripping device was executed to finish forming the bulge.

By providing only a limited amount of rotational movement so as to require two rotations to form the bulge, a significant amount of time was consumed in forming each bulge. The latency of reversing the movement of the components and executing multiple bulge forming movements slowed the fabrication rate of the twist pins. The rotational mass of the sprocket and the clamping mechanism with its attached solenoid activation clamping device reduced the rate at which these elements could be accelerated, and also constituted a limitation on the speed at which twist pins could be fabricated. Apart from the rotational mass issues, acceleration had to be limited to avoid inducing wire slippage. The need to reverse the direction of movement of numerous reciprocating components limited the rate at which the twist pins bulges could be fabricated.

After formation of the bulges in the prior art twist pin fabricating machine, the wire with the formed bulges was cut to length to form the twist pin. The leader of the twist pin extended into a venturi through which gas flowed. The effect of the gas flowing through the venturi was to induce a slight tension force on the wire, and hold it while a laser beam severed the wire at the desired length. The laser beam fused the ends 70 and 74 of the strands 54 and 56 as it severed the fabricated twist pin from the length of wire. The tension force induced on the wire by the gas flowing through the venturi propelled the twist pins into random pile called a "haystack." After a sufficient number of twist pins had accumulated, they were placed into a separate sorting and singulating machine which ultimately delivered the twist pins one at a time in a specific orientation into a carrier. The pins were later heat treated and transferred from the carrier and inserted into the three-dimensional modules.

The process of sorting the twist pins, orienting them, delivering them into the carrier, and making sure that the twist pins were received properly within the carrier required considerable human intervention and machine handling after the twist pins were fabricated. Occasionally the twist pins would be lodged in tubes which guided the twist pins into the carrier by an air flow. Delivering the twist pins into the receptacles in the carrier was also difficult, and human intervention was required to assure that the twist pins were properly received in the receptacles. Twist pin sorting also occasionally resulted in jamming and bending the twist pins. In general, the post-fabrication processing steps required to organize the twist pins for their subsequent use contributed to overall inefficiency.

These and other considerations pertinent to the fabrication of twist pins have given rise to the new and improved aspects of the present invention.

SUMMARY OF THE INVENTION

One improved aspect of the present invention involves conveying fabricated twist pins from a twist pin fabricating machine and storing the fabricated twist pins in the such manner that allows twist pins to be more efficiently fabricated and used compared to previous techniques. Another improved aspect of the present invention involves handling the twist pins after fabrication without damaging or otherwise adversely affecting the relatively small and delicate twist pins, and doing so without incurring lost motion, added processing steps and other inefficiencies.

Another improved aspect of the invention involves efficiently conveying and storing the fabricated twist pins without requiring manual or mechanical sorting and without requiring mechanical contact and possible damage to the fabricated twist pins. Other aspects the present invention permit these improvements to be achieved with respect to twist pins of different sizes.

In one principal regard, the present invention relates to a mechanism for conveying a segment of wire from which an electrical connector has been fabricated from a point where the electrical connector wire segment is severed from a length of remaining wire into a receptacle within which the electrical connector wire segment is stored until use. The mechanism comprises a pneumatic inductor into which the wire segment is received. The pneumatic inductor includes a venturi assembly and the delivery tube assembly connected to the venturi assembly. The venturi assembly develops a reduced pressure which is applied to the wire segment in the pneumatic inductor and creates a gas flow through the delivery tube assembly. The reduced pressure induces a slight tension in the wire to facilitate severing the wire segment. The gas flow in the delivery tube assembly has a sufficient magnitude to convey the wire segment to the receptacle. The mechanism also includes a cassette and a movement device to which the cassette is connected. The cassette has a plurality of receptacles to receive the wire segments. The movement device moves the connected cassette to position each receptacle to receive a wire segment conveyed by the gas flow through the delivery tube assembly.

The invention also principally relates to a method of conveying a segment of wire from which an electrical connector has been fabricated from a point where the electrical connector wire segment is severed from a length of remaining wire into a receptacle within which the electrical connector wire segment is stored until use. This method involves the steps of developing a reduced pressure applied to the wire segment, creating a gas flow of a sufficient magnitude to convey the wire segment, and positioning another receptacle to receive another wire segment conveyed by the gas flow.

Preferred features of the invention involve venting each receptacle to conduct the gas flow through the receptacle of to permit the gas flow to carry the electrical connector wire segment entirely into each receptacle, sensing the passage of the wire segment into the receptacle and thereafter moving the cassette to position another receptacle to receive the next wire segment, withdrawing a delivery nozzle of the delivery tube assembly a sufficient distance from the cassette to avoid contacting cassette as cassettes are replaced after their receptacles have become filled with electrical connector wire segments, and maintaining a predetermined distance between the delivery nozzle and an upper surface of the cassette during movement of the cassette. Each cassette is preferably created by stacking a plurality of receptacle plates in which receptacle holes have been formed to define the receptacles. The positions of the receptacles in the cassette and position of the cassette relative to the movement device is registered so that moving the movement device and the cassette positions the receptacles to receive the wire segments. Preferably, the movement device is an x-y movement table whose movement is indexed after sensing the delivery of a wire segment into a receptacle.

The invention is also used conjunctively with severing the wire segment from the remaining length of the wire, preferably by focusing a laser beam ponder the wire to sever the wire by melting it. The reduced pressure applied by the venturi mechanism assists in separating the wire segment from the remaining wire during severing. The present invention is also preferably used in connection with fabricating twist pin electrical connectors from the wire formed by helically coiled strands. The wire segment forming the twist pin includes at least one bulge formed by uncoiling the strands in an anti-helical direction.

The severed wire segments are conveyed by the gas flow directly into the receptacles, without requiring separate human intervention and mechanical interaction fabricating the electrical connectors and loading them into a cassette.

The precise relationships between the receptacles and the gas flow path allow the cassette to precisely positioned on an automated repetitive basis to receive each newly fabricated connector as rapidly as the connectors are fabricated. Loading the fabricated connectors into the receptacles of the cassette occurs without manual contact of the pins, which might bend or damage the twist pins. The gas flow through the delivery tube assembly carries the fabricated twist pins completely into the receptacles. The cassette provides a convenient arrangement for storing the electrical connectors, for holding the electrical connectors during further processing, such as heat treatment, and making the electrical connectors conveniently available for removal and insertion in the printed circuit boards.

A more complete appreciation of the present invention and its scope may be obtained from the accompanying drawings, which are briefly summarized below, from the following detailed descriptions of presently preferred embodiments of the invention, and from the appended claims.

DETAILED DESCRIPTION

Figure 6:
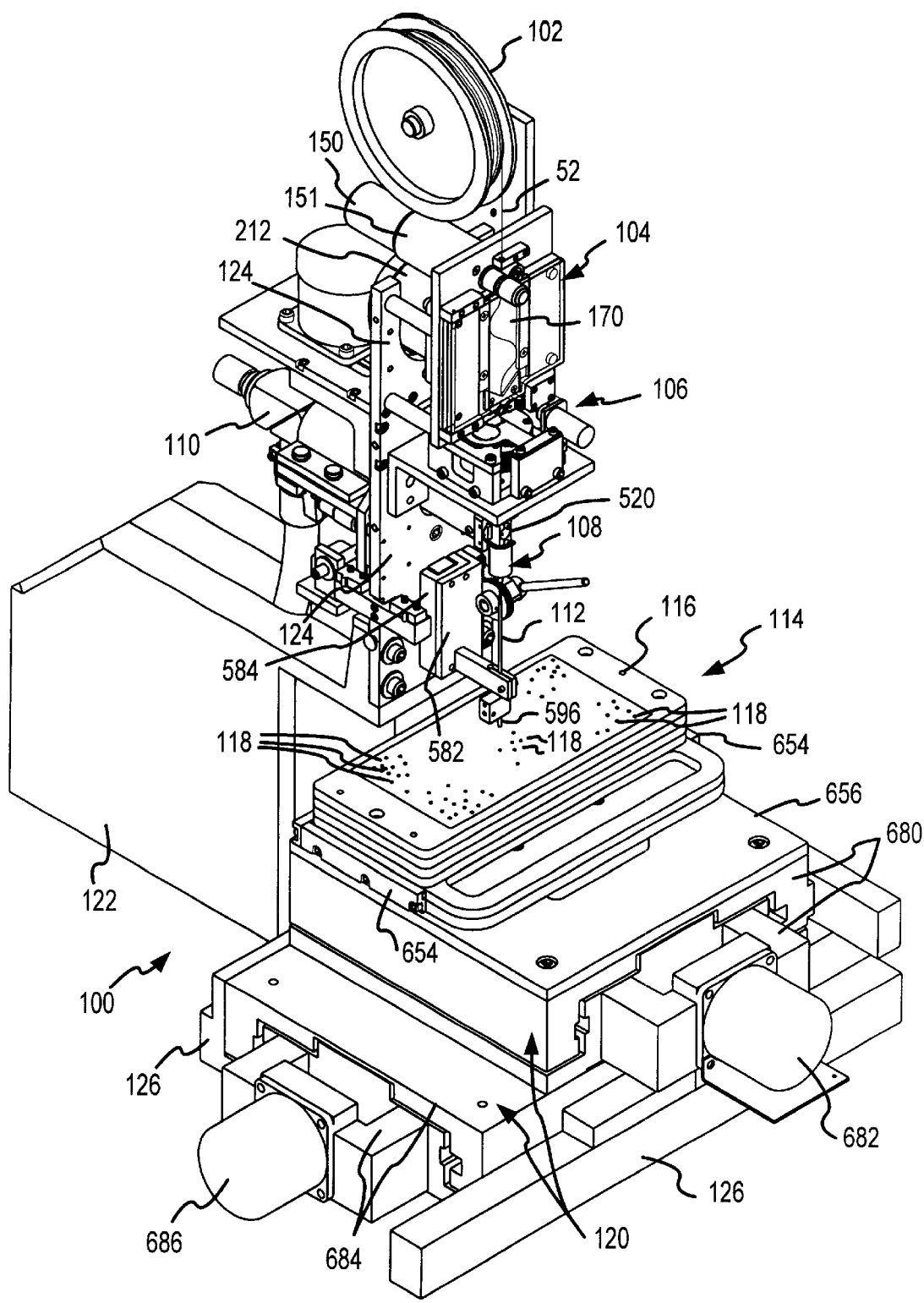
FIG. 6 is a perspective view of a machine for fabricating twist pins of the type shown in FIG. 1, in accordance with the present invention.

The present invention is preferably incorporated in an improved machine 100 which fabricates twist pins 50 (FIG. 1), and in an improved methodology for conveying and delivering the fabricated twist pins, as shown and understood by reference to FIG. 6. The twist pins are fabricated from the gold-plated, berylliumcopper wire 52 which is wound on a spool 102. A wire feed mechanism 104 of the machine 100 unwinds the wire 52 from the spool 102 and accurately feeds the wire to a bulge forming mechanism 106 which is located below the wire feed mechanism 104. The bulge forming mechanism forms the bulges 58 (FIG. 1) at precise locations along the length of the wire 52. The positions where the bulges 58 are formed is established by the advancement of the wire 52 by the wire feed mechanism 104. The bulge forming mechanism 106 forms the bulges by gripping the wire 52 and untwisting the wire in the reverse or anti-helical direction.

After all of the bulges of the twist pin 50 (FIG. have been formed by the bulge forming mechanism 106, the wire feed mechanism 104 advances the twist pin configuration formed in the wire 52 into a pneumatic inductor mechanism 108. With the twist pin positioned in the inductor mechanism 108, the end 74 of the tail 72 or the end 70 of the leader 68 (FIG. 1) of the twist pin configuration is located below the bulge forming mechanism 106. A laser beam device 110 is activated and its emitted laser beam melts the wire 52 at the ends 70 and 74 (FIG. 1), thus completing the formation of the twist pin 50 by severing the fabricated twist pin from the remaining wire 52.

Figure 4:
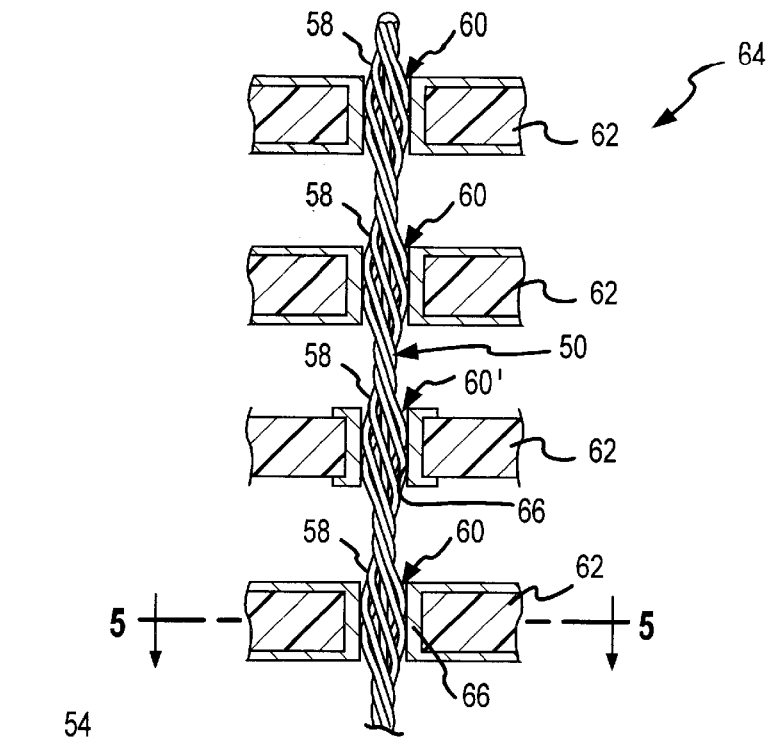
FIG. 4 is a partial, vertical cross-sectional view of a prior art three-dimensional module, formed by multiple printed circuit boards and illustrating a single twist pin of the type shown in FIG. 1 extending through vertically aligned vias of the printed circuit boards of the module.
Figure 2:
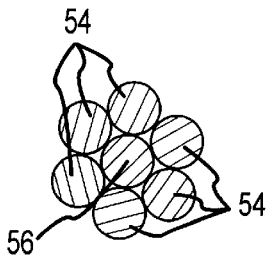
FIG. 2 is an enlarged, cross-sectional view of the twist pin shown in FIG. 1, taken substantially in the plane of line 2—2 shown in FIG. 1.
Figure 3:
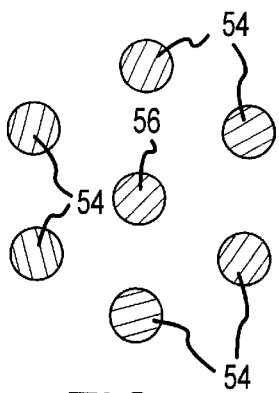
FIG. 3 is an enlarged, cross-sectional view of the twist pin shown in FIG. 1, taken substantially in the plane of line 3—3 shown in FIG. 1.
Figure 5:
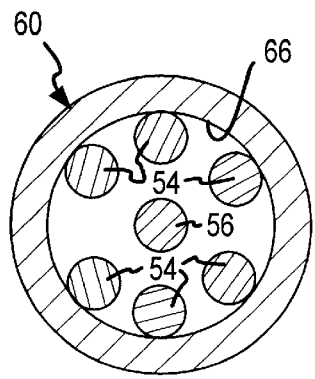
FIG. 5 is an enlarged cross-sectional view of the twist pin within a via shown in FIG. 4, taken substantially in the plane of line 5—5 shown in FIG. 4.

The severed twist pin is released into the pneumatic inductor mechanism 108 of the present invention. The inductor mechanism 108 applies a slightly negative relative gas or air pressure or suction to the twist pin, and creates a gas flow which conveys the severed twist pin downward through a tube 112 of a twist pin receiving mechanism 114 which is also a part of the present invention. The twist pin receiving mechanism 114 includes a cassette 116 into which receptacles 118 are formed in a vertically oriented manner. The tube 112 of the inductor mechanism 108 delivers one twist pin into each of the receptacles 118. Once a twist pin occupies one of the receptacles 118, an x-y movement table 120 moves the cassette 116 to position an unoccupied receptacle 118 beneath the tube 112. The x-y movement table 120 continues moving the cassette 116 in this manner until all of the receptacles 118 have been filled with fabricated twist pins. Once the cassette 116 has been filled with twist pins, the filled cassette is removed and replaced with an empty cassette, whereupon the process continues. Later after heat treatment, the fabricated twist pins are removed from the cassette 116 and inserted into the vias 60 to form the three-dimensional module 64 (FIG. 4).

The operation of the wire feed mechanism 104, the bulge forming mechanism 106, the inductor mechanism 108, the laser beam device 110 and the twist pin receiving mechanism 114 are all controlled by a machine microcontroller or microcomputer (referred to as a "controller," not shown) which has been programmed to cause these devices to execute the described functions. The spool 102, the wire teed mechanism 104, the bulge forming mechanism 106, the inductor mechanism 108 and the laser beam device 110 are interconnected and attached to a first frame element 122. A support plate 124 extends vertically upward from the first frame element 122, and the wire feed mechanism 104, the bulge forming mechanism 106 and the inductor mechanism 108 are all connected to or supported from the support plate 124. The twist pin receiving mechanism 114 is connected to a second frame element 126. Both frame elements 122 and 126 are connected rigidly to a single structural support frame (not shown) for the entire machine 100. All of the components shown and described in connection with FIG. 6 are enclosed within a housing (not shown).

More details concerning the twist pin fabricating machine 100 and method of fabricating twist pins are described in the above-referenced and concurrently-filed U.S. patent application, Ser. No. 190.326. Specific details concerning the wire feed mechanism 104 are described in the above-referenced and concurrently-filed U.S. patent application, Ser. No. 190.327. However, some of the more specific but nevertheless general details of the wire feed mechanism 104 are next described as context for the present invention.

Figure 7:
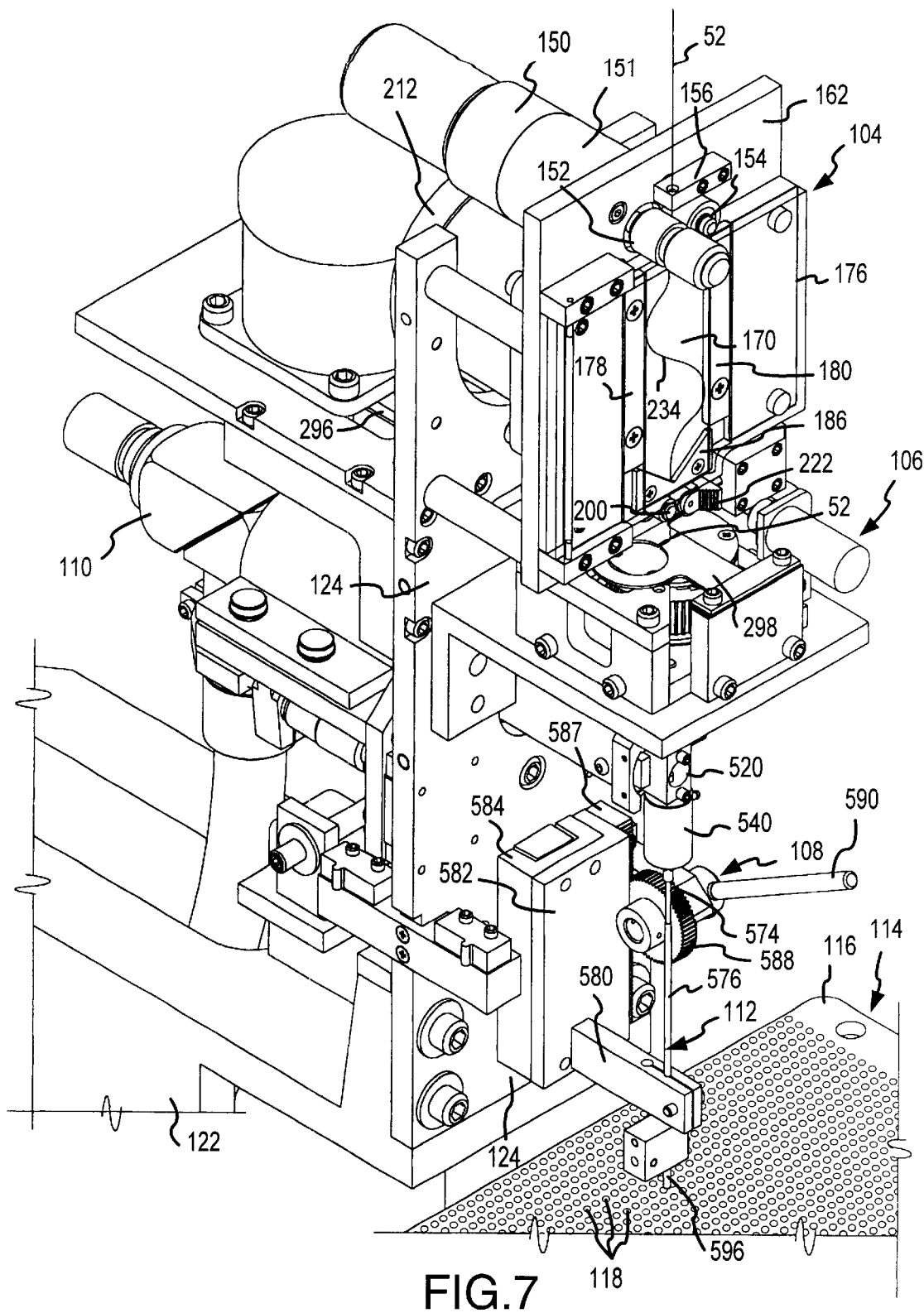
FIG. 7 is an enlarged perspective view of a wire feed mechanism, a bulge forming mechanism, an inductor mechanism and a portion of a twist pin receiving mechanism of the twist pin fabricating machine shown in FIG. 6.

As shown in FIGS. 6 and 7, the wire feed mechanism 104 includes a pre-feed electric motor 150 that rotates a connected, speed-reducing gear head 151. A capstan 152 is connected to and rotated by the gear head 151. The wire 52 extends between the capstan 152 and an adjacent idler roller 154. The outer surfaces of the capstan 152 and the roller 154 apply sufficient frictional force on the wire 52 to firmly grip the wire between the capstan 152 and the roller 154 and to advance the wire without slippage when the capstan 152 is rotated. Rotating the capstan 152 to advance the wire 52 also unwinds wire 52 from the spool 102.

The rotating capstan 152 advances the wire 52 into a cavity 170. A front transparent door 176 covers the cavity 170. Vertically extending contact bars 178 and 180 are positioned on the opposite lateral sides of the cavity 170. A cavity exit guide 186 is located at the bottom of the cavity 170. The wire 52 is withdrawn from the cavity 170 by rotating a wire feed spindle 200. A precision feed motor 212 is connected to rotate the spindle 200. A pinch roller 220 is biased toward the spindle 200 to establish good frictional contact of the wire 52 between the spindle 200 and the pinch roller 220 to precisely advance the wire 52 by an amount determined by the rotation of the precision feed motor 212.

As the wire in the cavity 170 is fed out by the precision feed motor 212 and spindle 200, the pre-feed motor 150 and the capstan 152 feed more wire into the cavity. A slack amount of wire is accumulated in the cavity 170 as an S-shaped configuration 234. The S-shaped configuration 234 consumes enough slack wire within the cavity to form at least one twist pin. The slack wire of the S-shaped configuration 234 is not under tension, resistance or rotational inertia effects from the spool 102 (FIG. 6), thereby allowing the wire 52 to be advanced precisely from the cavity 170 into the bulge forming mechanism 106 by the precision feed motor 212 and the spindle 200, thereby allowing the precision feed motor 212 and spindle 200 to advance a desired amount of wire quickly.

The S-shaped configuration 234 is maintained as a result of the pre-feed motor 150 advancing wire into the cavity until bends of the S-shaped configuration 234 contact the contact bars 178 and 180. When the bends of the S-shaped configuration 234 contact both contact bars 178 and 180, the pre-feed motor 150 is de-energized. Thereafter, as the precision feed motor 212 and spindle 200 withdraw wire from the cavity 170, causing the S-shaped configuration 234 to become narrower and withdraw the bends of the S-shaped configuration from the contact bars 178 and 180, power is again supplied to the pre-feed motor 150 to advance more wire into the cavity 170 until the S-shaped configuration is reestablished.

The precision feed motor 212 is preferably a conventional stepper motor. As such, the times of its rotation and the extent of its rotation are precisely controlled by pulse signals which cause the stepper motor 212 to rotate in a predetermined increment of a full rotation for each pulse delivered. Because of the relatively rapid response and acceleration characteristics of the stepper motor 212, the stepper motor 212 is capable of advancing the wire 52 very rapidly and imprecise amounts to achieve precise positioning of the wire 52 during the formation of the bulges 58 and when the wire segment in which the twist pin has been fabricated is severed from the remaining wire.

Specific details concerning the bulge forming mechanism 106 are described in the above-referenced and concurrently-filed U.S. patent application, Ser. No. 190.328. However, some of the general details of the bulge forming mechanism 106 are described here as context for the present invention.

The bulge forming mechanism 106 (FIGS. 6 and 7) comprises a stationary gripping assembly, a rotating gripping assembly, and a drive motor which rotates the gripping assemblies relative to one another in complete relative revolutions. The wire 52 is advanced from the feed wire mechanism 104 through a stationary clamp member 298 (FIG. 7) of the stationary gripping assembly and through a rotating clamp member of the rotating clamp assembly which is positioned directly below the stationary clamp member 298 (FIG. 7). The stationary clamp member and the rotating clamp member open approximately simultaneously to allow the wire 52 to be advanced. Both the stationary and the rotating clamp members thereafter close approximately simultaneously to grip the wire 52.

Figure 1:
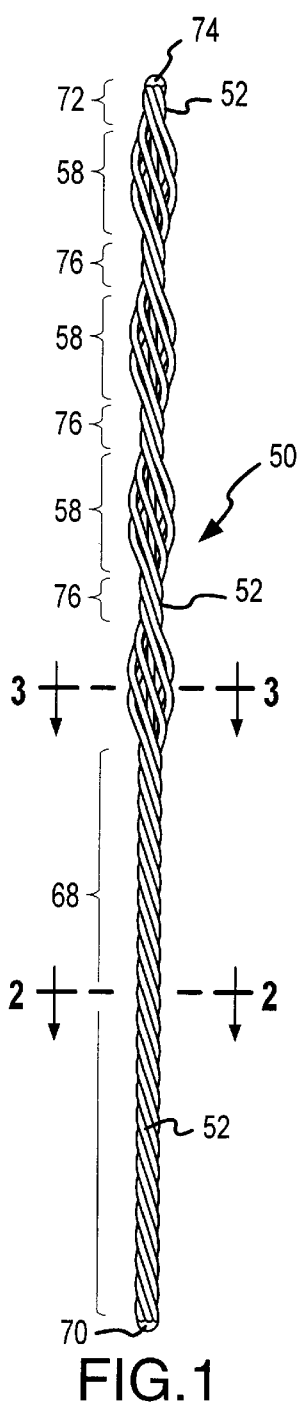
FIG. 1 is a side elevational view of a prior art twist pin.

The stationary clamp member closes around the wire 52 with sufficient force to restrain the wire 52 against rotation. The rotating clamp member also closes around the wire 52 with sufficient force to hold the wire 52 stationary with respect to the rotating clamp member. However, because the rotating clamp member is rotating, the grip of the wire 52 by the rotating clamp member rotates the wire 52 in the opposite or anti-helical direction compared to the direction that the strands 54 have been initially wound around the core strand 56 (FIG. 1). As a result of the reverse or anti-helical rotation imparted by the rotating gripping assembly one bulge 58 is formed between the rotating clamp member and the stationary clamp member.

After formation of the bulge 58, both the stationary and the rotating clamp members are again opened, and the wire feed mechanism 104 advances the wire 52 to position the wire at a predetermined position along the length of the wire 52 where the next bulge 58 (FIG. 1) will be formed. After all the bulges have been formed along a segment of the wire which constitutes the twist pin 50, it is necessary to sever the twist pin configuration from the remaining continuous wire in order to complete the fabrication of the twist pin. Under such conditions, the wire is advanced until the end 70 of the leader 68 or the end 74 of the tail 72 (FIG. 1) is in a position below the bulge forming mechanism 106 (FIGS. 6 and 7). The wire 52 is advanced by the wire feed mechanism 104 through the bulge forming mechanism 106 until a point on the wire is aligned with the point where a laser beam will be trained onto the wire. The laser beam device 110 is then activated, and the energy from the laser beam severs the wire by melting it into two pieces, thus forming an end 74 of the in tail 72 on one severed piece and the end 70 of the leader 68 on the other severed piece (FIG. 1). Melting at the ends 70 and 74 fuses the strands 54 and 56 together to simultaneously form the ends 70 and 74. The severed twist pin whose fabrication has just been completed is removed by the inductor mechanism 108 and conveyed to a receptacle 118 of the cassette 116.

Details concerning the pneumatic inductor mechanism 108 of the present invention are described in connection with FIGS. 6–9. The inductor mechanism 108 comprises a venturi assembly 540 connected to a delivery tube assembly 542. Gas, typically air, is delivered from a gas source (not shown) to the venturi assembly 540 through an input fitting 544, and is forced downward through the venturi assembly 540. The gas flow characteristics within the venturi assembly 540 create low pressure within the venturi assembly, and this low pressure creates a downward-directed tension on the wire which has been advanced from the bulge forming mechanism 106 into the venturi assembly 540. Of course, the wire in the venturi mechanism 540 includes the bulges 58 and other characteristics of the twist pin 50 (FIG. 1) which have previously been formed by the bulge forming mechanism 106 and the wire feed mechanism 104. The gas flow-induced downward tension is applied to the wire prior to energizing the laser beam device 110 (FIG. 6 and 7) to sever the wire. The slight downward tension holds the wire in tension which facilitates severing the wire at a desired location where the ends of the twist pins are formed an also facilitates the separation of the severed wire at those ends while achieving the desired cut geometry. Once the fabricated twist pin has been severed from the wire, the low pressure within the venturi assembly 540 propels the severed twist pin from the venturi assembly 540 and into the delivery tube assembly 542 where the gas flow conveys the fabricated twist pin.

The twist pin is delivered from the delivery nozzle 596 of the delivery tube assembly 542 into a receptacle 118 of the cassette 116, as is understood from FIGS. 6–8, and 10–12. After the twist pin has been received in one of the receptacles 118 of the cassette 116, the position of the cassette 516 is changed by movement of the x-y movement table 120 to position an unoccupied receptacle 118 below the delivery nozzle 596 of the delivery tube assembly 542. The unoccupied receptacle receives the next fabricated twist pin. In this manner, as each twist pin is fabricated, it is delivered to and loaded into an unoccupied receptacle 118 of the cassette 116. When all the receptacles of the cassette have been filled with fabricated twist pins, the twist pin fabricating machine 100 ceases fabricating twist pins until the filled cassette is removed from the x-y movement table and replaced with a new cassette having empty receptacles. The twist pins are later heat treated and removed from the receptacles of the cassette and inserted into the three-dimensional modules to create electrical connections between the printed circuit boards of those modules (FIG. 4).

Figure 9:
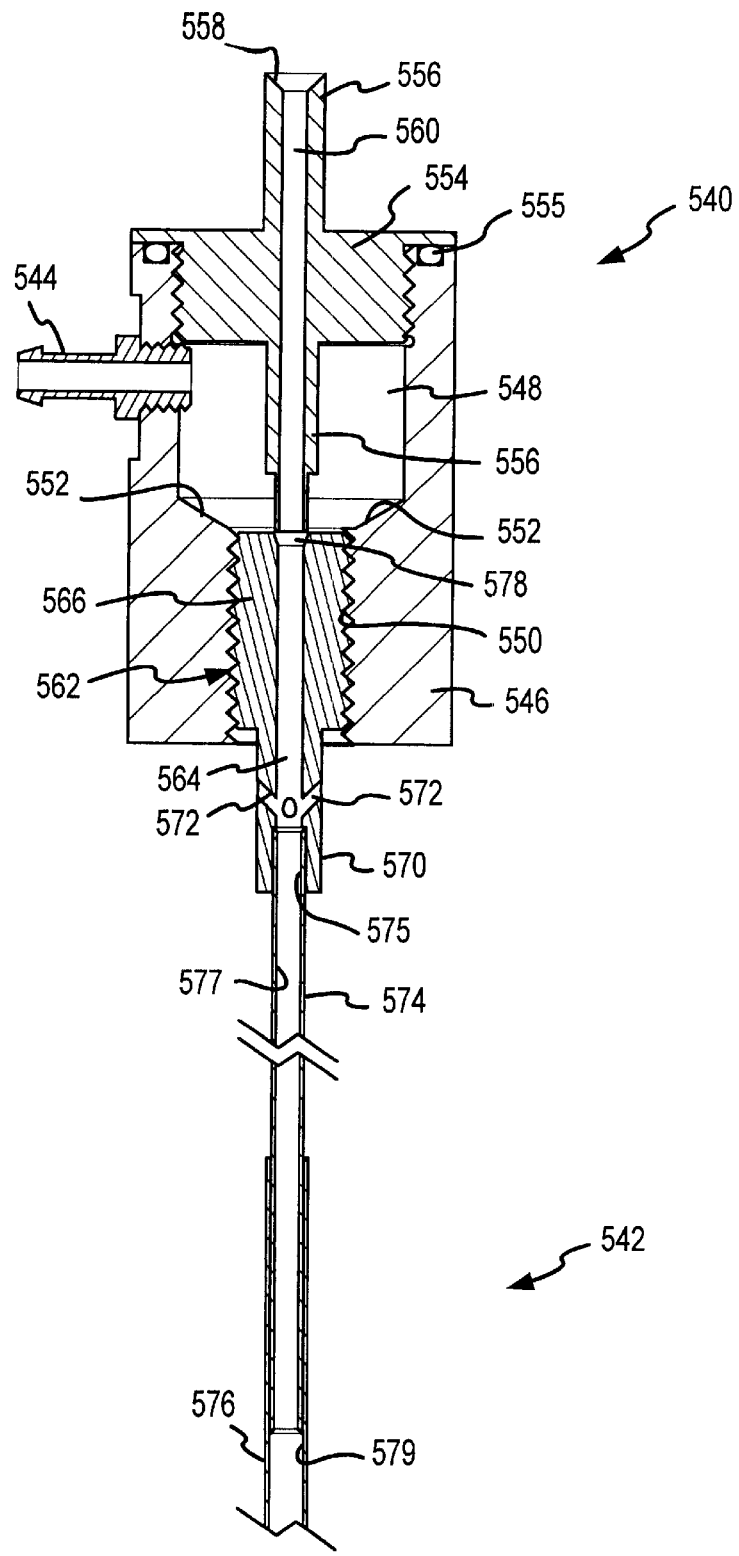
FIG. 9 is an enlarged, axial cross-sectional view of a venturi assembly and a portion of a delivery tube assembly of the inductor mechanism shown in FIG. 8.

The venturi assembly 540 is shown in FIG. 9 as comprising a main body element 546 which is attached below a cutting chamber 520 (FIG. 7) into which the laser beam of the laser beam device 110 is focused and through which the wire passes. The body element 546 has an open interior defined by an upper chamber 548 and a lower passageway 550. A venturi-shaped orifice 552 tapers from the upper chamber 548 to the lower passageway 550, thus reducing the cross-sectional area of the interior of the body element 546 between the upper chamber 548 and the lower passageway 550. The input fitting 544 delivers the pressurized gas into the upper chamber 548.

A cap 554 is attached by threaded engagement to the upper end of the body element 546 to close the upper end of the chamber 548. A resilient O-ring 555 is located between the cap 554 and the body element 546 to seal the cap 554 to the upper end of the chamber 548 in a fluid tight manner. A nozzle tube 556 extends axially through the cap 554 and into the upper chamber 548. The nozzle tube 556 is positioned coaxially relative to the upper chamber 548 and the lower passageway 550. The nozzle tube 556 is sealed to the cap 554 in an airtight or integral manner. An upper end 558 of the nozzle tube 556 converges downwardly and inwardly into a center bore 560 through the nozzle tube 556. The center bore 560 extends downwardly through the upper chamber 548 and terminates at a location approximately where the venturi orifice 552 joins the lower passageway 550.

A delivery tube connector piece 562 is attached by threaded engagement into the passageway 550. The connector piece 562 also includes a center bore 564 which is located in coaxial alignment with the center bore 560 of the nozzle tube 556. A lower portion 570 of the connector piece 562 continues the center bore 564 downward. Holes 572 extend transversely through the lower portion 570 from the center bore 564 to the exterior of the connector piece 562. An upper tube 574 of the delivery tube assembly 542 connects into a counterbore 575 at the bottom of the center bore 564 of the connector piece 562, to smoothly continue the center bore 564 into an interior passageway 577 of the upper tube 574.

The application of gas pressure through the input fitting 544 into the upper chamber 548 causes the gas to flow downward through the venturi orifice 552 into a flared opening 578 at the upper end of the center bore 564. Because the venturi orifice 552 and the flared opening 578 reduce the cross-sectional size of the gas flow path out of the chamber 548 and into the center bore 564, the gas speed increases substantially as it passes into the flared opening 578. The increased speed of the gas reduces the pressure at the bottom end of the nozzle tube 556, relative to ambient pressure. The center bore 560 through the nozzle tube 556 communicates this reduced pressure to the upper end 560 of the nozzle 556. The reduced pressure communicated through the nozzle tube 556 surrounds the twist pin which extends into the center bore 568 of the nozzle tube 556. The reduced pressure surrounding the twist pin causes the downward force on the twist pin and tension on the wire to which the twist pin configuration is connected, as the twist pin is severed from the wire. Once the twist pin is severed from the wire, the reduced pressure accelerates the fabricated twist pin through the center bore 560 of the nozzle tube 556 and into the center bore 564 of the connector piece 562. The momentum induced by the reduced pressure coupled with the gas flow through the center bore 564 carries the fabricated twist pin through the center bore 564 and into an interior passageway 577 of the upper delivery tube 574 of the delivery tube assembly 542.

The holes 572 in the lower portion 570 of the connector piece 562 vent some of the gas flowing in the center bore 564 to the ambient atmosphere to moderate some of the flow rate of the gas moving through the center bore 564 and the upper delivery tube 574. The remaining gas flow moving from the center bore 564 into the interior passageway 577 of the upper delivery tube 574 is the primary force which carries the fabricated twist pin through the delivery tube assembly 542 and into a receptacle 118 of the cassette 116 (FIG. 7), although this downward movement is assisted by gravity.

Figure 8:
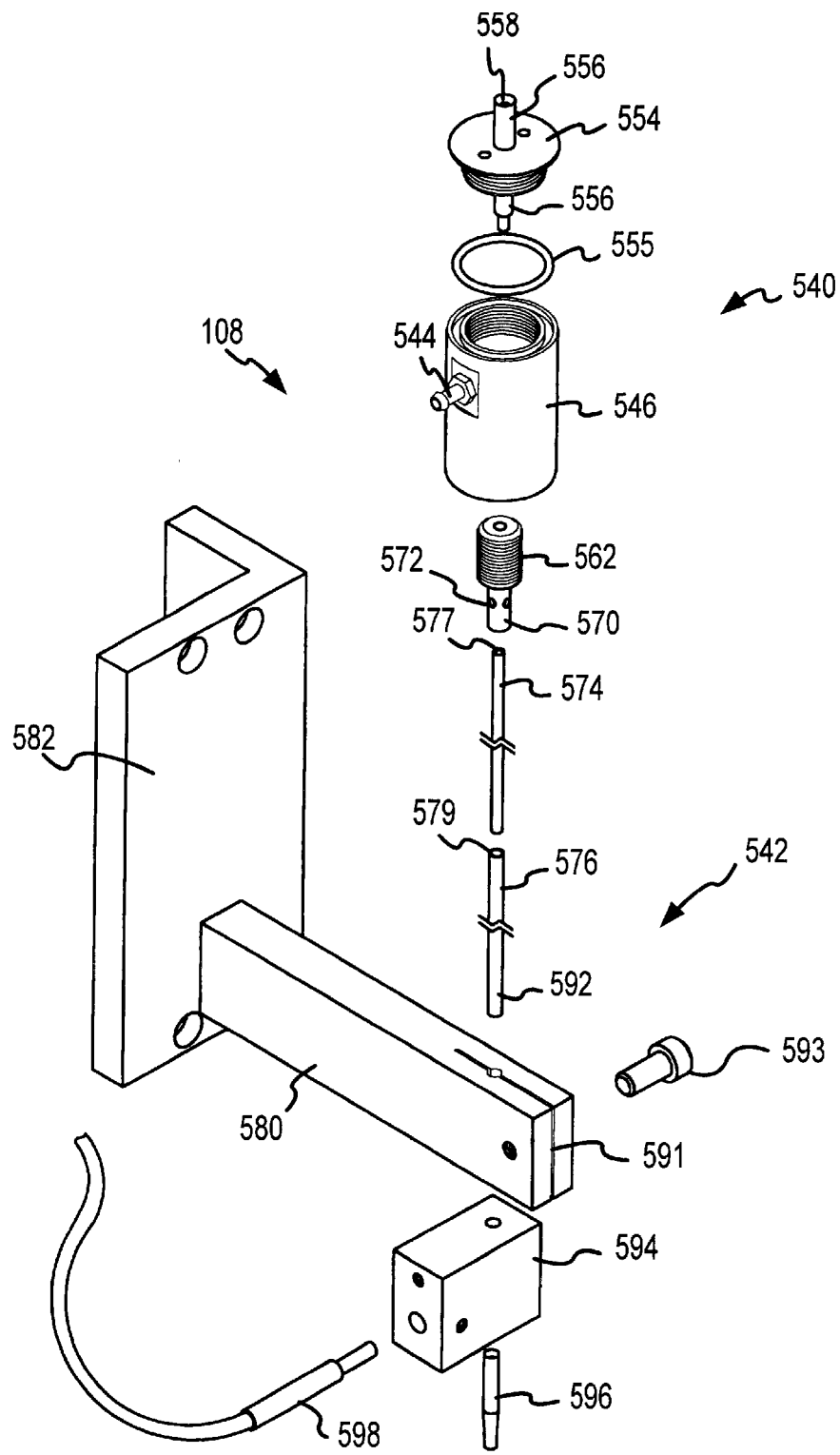
FIG. 8 is an exploded, perspective view of the inductor mechanism shown in FIGS. 6 and 7, with portions broken out for clarity of illustration.

The delivery tube assembly 542 includes the upper delivery tube 574 and a lower delivery tube 576, as shown in FIGS. 7–9. The upper delivery tube 574 telescopes into an inside bore 579 of the lower delivery tube 576. The lower delivery tube 576 is connected to a support arm 580. The support arm 580 extends from a carrier plate to 582, as shown in FIGS. 6 and 7. The carrier plate 582 is movably attached to the support plate 124 to move in a generally vertical manner relative to a carrier base 584. The carrier base is stationarily connected to the support plate 124. A toothed rack member 586 (FIG. 7) is attached to the carrier plate 582, and a pinion gear 588 meshes with the teeth of the rack member 586. The pinion gear 588 is rotationally attached to the support plate 124 by a bracket (not shown). A lever 590 is connected to the pinion gear 588, and the pinion gear 588 rotates when the lever 590 is pivoted. Pivoting the lever 590 rotates the pinion gear 588 which moves the meshed rack member 586 and the attached carrier plate 582 upward and downward relative to the carrier base 584 which is stationarily connected to the support plate 124.

The lower delivery tube 576 is adjustably connected to the support arm 580 at a pinch connection formed by a slot 591 which extends into an outer end of the support arm 580 and thereby bifurcates the outer end of the support arm 580. A screw 593 extends through one of the end portions of the support arm 580 and is threaded into a threaded hole 595 in the other end portion. Tightening the screw 593 pinches the end portions of the support arm 580 around the lower delivery tube 576 to hold the lower delivery tube 576 in a fixed position relative to the support arm 580. Consequently, the lower delivery tube 576 moves vertically in conjunction with the vertical movement of the carrier plate 582. The lower delivery tube 576 is free to move relative to the upper delivery tube 574 because of the telescoped receiving relationship of the upper delivery tube 574 within the lower delivery tube 576. Pivoting the lever 590 therefore raises and lowers a lower end 592 of the lower delivery tube 576.

A sensor block 594 is connected to the lower end of the support arm 580. The sensor block 594 continues the center bore 597 (FIG. 9) from the lower delivery tube 576 to a delivery nozzle 596. The delivery nozzle 596 is connected to the sensor block 594 and extends below it. Twist pins moving downward through the lower delivery tube 576 continue through the sensor block 594 and exit from the delivery nozzle 596. A photoelectric sensor 598 is positioned within the sensor block 594 at a location to sense the passage of a twist pin through the bore of the sensor block 594 and out of the delivery nozzle 596. The delivery nozzle 596 is preferably made from a transparent or translucent acrylic or glass material so that a light beam extending through the bore of the sensor block is able to detect the passage of a twist pin.

If a signal from the sensor 598 is not received by the machine controller (not shown) one of two conditions is indicated. One condition is that the fabricated twist pin has become jammed in the delivery tubes 574 or 576 The other condition is that the laser beam device 110 (FIG. 7) has failed to sever the wire and disconnect the fabricated twist pin. Either condition will result in the termination of operation of the machine 100 (FIG. 6).

Because the sensor block 594 is connected to the lower end of the lower delivery tube 576 and the delivery nozzle 596 is connected to the sensor block 594, the position of the delivery nozzle may be adjusted relative to the height of the cassette 116 (FIG. 7) by adjusting the position of the lower delivery tube 576 in the pinch connection at the end of the support arm 580. Adjusting the position of the lower delivery tube 576 in the pinch connection positions the delivery nozzle 596 to accommodate cassettes 116 of different thicknesses. As discussed below, cassettes of different thicknesses accommodate different lengths of twist pins. The vertical adjustment of the delivery nozzle 596 controls the space between the delivery nozzle 596 and an upper surface of the cassette 116 (FIG. 7) to assure a smooth transition of the fabricated twist pin out of the delivery nozzle 596 and into a receptacle 118 of the cassette 116 (FIG. 7).

It is desirable to move the delivery nozzle 596 upward away from the cassette 116 when one filled cassette is replaced with another empty cassette, so that the movement of the cassettes does not inadvertently contact and damage the delivery nozzle 596. Pivoting the lever 590 as described above vertically withdraws the delivery nozzle 596 from the upper surface of the cassette 116 (FIG. 7). Pivoting the lever 590 causes the carrier plate 582 to move vertically, and the connected support arm 580 lifts the lower delivery tube 576 to which the delivery nozzle 596 is connected.

By positioning the upper delivery tube 574 into the interior passageway 597 of the lower delivery tube 576, a slight expansion of the channel through the tubes 574 and 576 occurs at the point where the two tubes 574 and 576 telescopically connect to one another. Because of the expansion, there is no edge or obstruction which would tend to interfere with the passage of the fabricated twist pins through the delivery tube assembly 542. Moreover, by placing the delivery nozzle 596 immediately above a receptacle in a cassette, and by precisely positioning the cassette, there is little opportunity that an edge of the receptacle 118 will interfere with the passage of the twist pin into the receptacle.

In essence, the delivery tube assembly 542 provides a straight path for conducting the twist pins into the receptacles. Because of the ability of the bulge forming mechanism 106 to fabricate the twist pins with symmetrical bulges and without deflecting the twist pin from a coaxial relationship along its length, the fabricated twist pins are less likely to jam or hang up as they are conducted by the delivery tube assembly 542 into the receptacles 118 of the cassette. The venturi assembly 540 and the delivery tube assembly 542 smoothly convey the fabricated twist pins without obstruction or resistance from the delivery and guiding elements of the tube delivery assembly 542. The fabricated twist pins are moved rapidly into the receptacles of the cassette without manual contact as a result of the acceleration and the airflow resulting from the low-pressure gas flow and pneumatic effects created by the venturi assembly 540.

The twist pin receiving mechanism 114 includes the cassette 116 which is shown in greater detail in FIGS. 10–13. The cassette 116 includes a pallet plate 610 from which a handle 612 extends. By grasping the handle 612, the entire cassette 116 is manipulated. For example, the cassette 116 is placed on the machine 100 (FIG. 6) for use or removed from the machine. The cassette 116 may be used to transport the fabricated twist pins or to store the twist pins until they are to be used. Moreover, the cassette 116 can be used to confine the twist pins during heat treatment.

Figure 10:
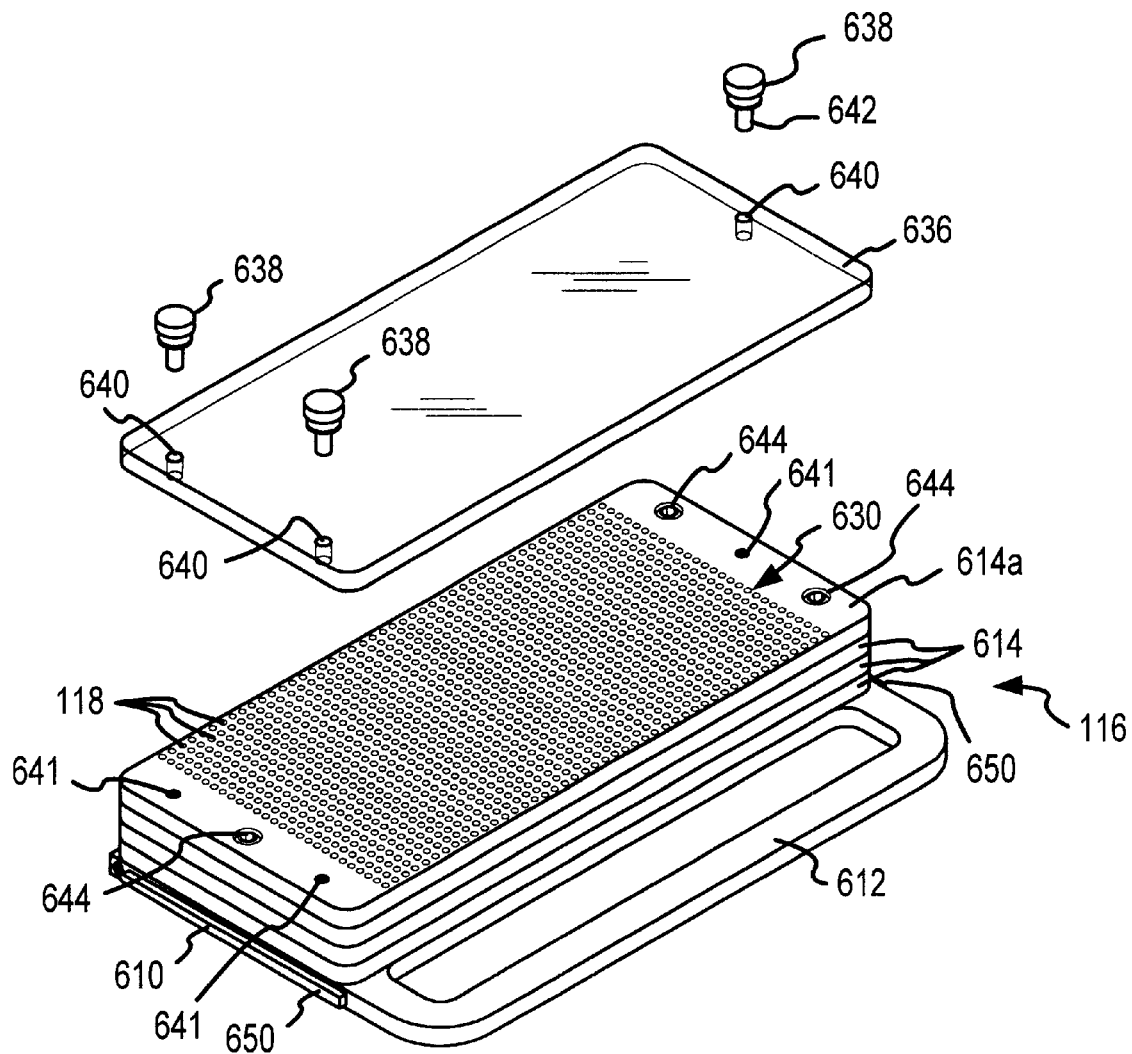
FIG. 10 is an enlarged perspective view of a cassette shown in FIGS. 6 and 7, also including a cover plate shown in exploded relation to the cassette.
Figure 11:
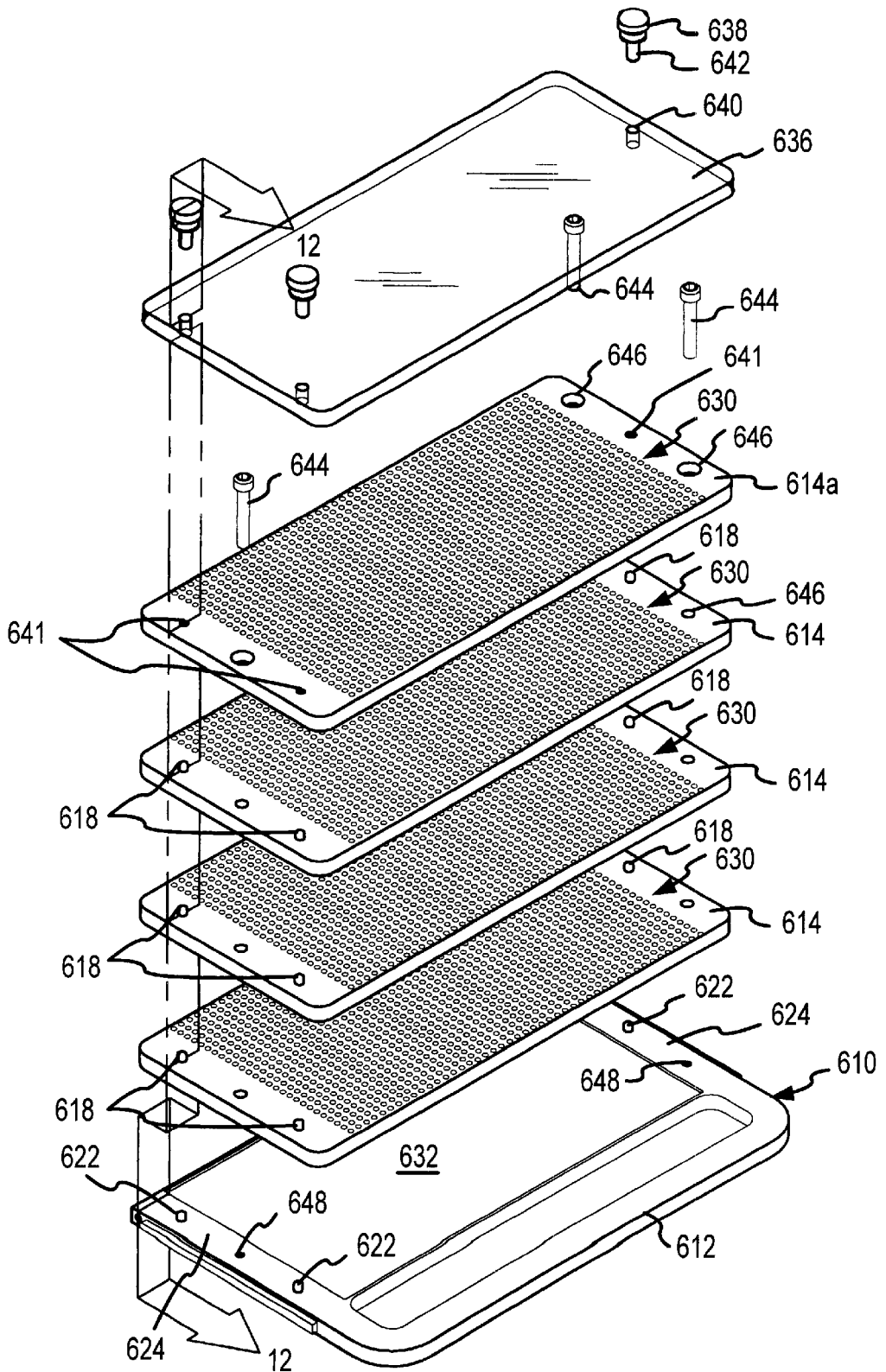
FIG. 11 is an exploded view of the components of the cassette shown in FIG. 10.
Figure 12:
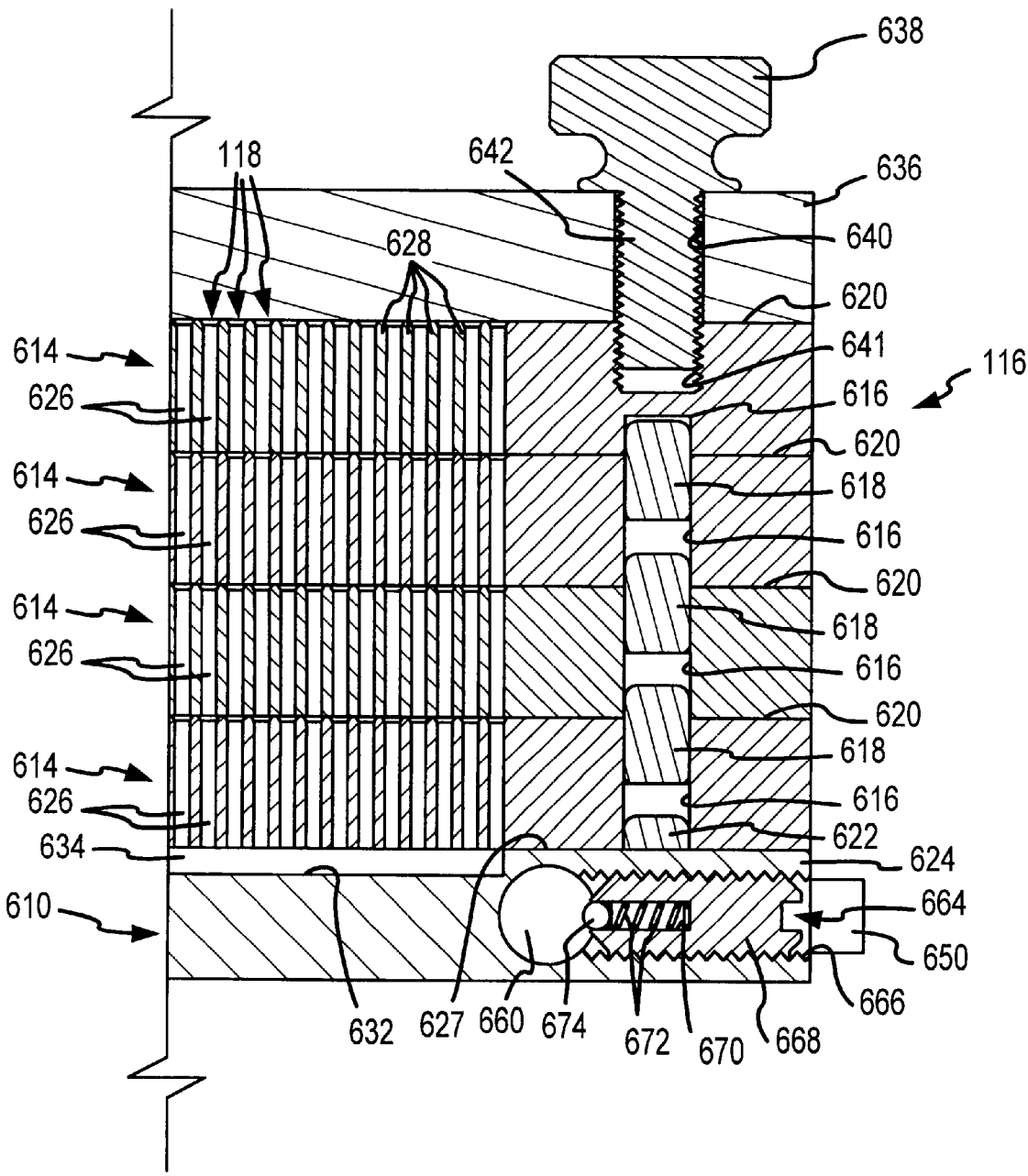
FIG. 12 is an enlarged, partial cross-sectional view of a portion of the cassette shown in FIG. 11, taken substantially in the plane 12—12 of FIG. 11.

The cassette 116 further comprises at least one receptacle plate 614 connected to and supported from the pallet plate 610. Four receptacle plates 614 are shown in FIGS. 10–13 as forming the cassette 116. All of the receptacle plates 614 are basically identical in structure and configuration, except for minor details of difference in the uppermost receptacle plate 614a as are discussed below. Each lower receptacle plate 614 includes three registration holes 616 into which a registration pin 618 is inserted. A lower end of the registration pin 618 is press fit into the upper open end of the registration hole 616. An upper end of the registration pin 618 extends above an upper surface 620 of each lower receptacle plate 614. A lower portion of each registration hole 616 below the registration pin 618 is open, to receive the upper end of a registration pin 618 from an immediately below-positioned receptacle plate 614. The upper end of the below-positioned registration pins 618 slip fits into the lower ends of the registration hole 616. As shown in FIGS. 11 and 12, two registration holes 616 and registration pins 618 are located at one side of each of the lower receptacle plates 614, while a single registration hole 616 and registration pin 618 is located at the opposite side of the lower receptacle plates 614.

The pallet plate 610 also has three upwardly projecting registration pins 622 which are located on a peripheral portion 624 of the pallet plate 610 to slip fit into the lower open ends of the registration holes 616 of the lower receptacle plate 614 which rests on an upper surface 627 of the peripheral portion 624 of the pallet plate 610, as shown in FIG. 12. When the desired number of receptacle plates 614a and 614 are stacked on top of one another in registered alignment, each single receptacle 118 is formed by a vertically aligned series of receptacle holes 626 (FIG. 12) formed in the receptacle plates 614a and 614. The receptacle holes 626 are formed at the same locations within the receptacle plates. With the receptacle plates stacked in registered alignment as shown in FIG. 12, each receptacle hole 626 aligns with and continues the receptacle hole 626 of a preceding and following receptacle plate. In this manner, the individual receptacle holes 626 create a continuous receptacle 118 within which to receive the fabricated twist pin.

An upper the edge 628 (FIG. 12) of each receptacle hole 626 is slightly tapered upwardly and outwardly. The outward taper of the edge 628 forms a funnel-like surface to guide the end 70 or 74 of the fabricated twist pin 50 (FIG. 1) into the receptacle hole 626 at each interface between adjoining, stacked receptacle plates and at the upper surface 620 of the upper receptacle plate 614a. In most cases, the ends of the fabricated twist pin will not contact the tapered edges 628 of those receptacle plates 614 below the upper receptacle plate 614a. The alignment of the lower receptacle plates 614 by the registration pins 618 and registration holes 616 is sufficient to create generally continuous receptacles 118, and once the fabricated twist pin starts its movement through the first receptacle hole 626 of the upper receptacle plate 614a, it will continue through the aligned receptacle holes 626 in the lower receptacle plates without interruption.

In addition to forming all of the registration holes 626 in the same location within a generally rectangular shaped receptacle area 630 of the receptacle plates, each receptacle hole 626 is formed at a predetermined location within the area 630. The position of the axis of each of the receptacle holes 618 within an area 630 is precisely defined. The information defining the position of each individual receptacle hole 626, and hence the receptacle 118 itself, is used by the machine controller (not shown) to increment the position of the x-y movement table 120 to locate an unoccupied receptacle 118 below the delivery nozzle 596 (FIGS. 6 and 7) after the preceding receptacle is filled with a twist pin.

Although the alignment of the delivery nozzle 596 (FIG. 8) above each receptacle 118 is very precisely controlled by the movement of the x-y movement table 120, there is some opportunity for slight misalignment of the delivery nozzle 596 with the receptacle holes 626 formed in the upper receptacle plate 614*a*. It is under these conditions that the tapered upper edges 628 of the upper receptacle plate 614*a* is the most likely to be contacted by the end of the fabricated twist pin. The upper edge 628 of the upper receptacle plate 614*a* is therefore primarily useful in assisting the entry of the fabricated twist pins into the receptacle holes 626 of the upper receptacle plate 614*a* as the twist pins are delivered from the delivery nozzle 596 (FIG. 8).

Because of the relatively large receptacle area 630 and close spacing between the receptacle holes 626, a relatively large number of receptacles 118 may be formed in a single cassette 116. For example, approximately 10,000 receptacles 118 may be formed in a receptacle area 630 of approximately 4 inches by 8 inches, when each of the receptacles is 0.028 inches in diameter. Each of the receptacle plates 614 is preferably formed of an aluminum alloy material having a vertical thickness of approximately 0.25 in. A fabricated twist pin having a length of approximately 0.5 in. will generally be about the shortest length twist pin used. More typically, the length of the fabricated twist pin will be approximately 1.0, 1.5 or 2.0 inches in length. Thus, making each of the receptacle plates 614 with a thickness of 0.25 inches allows two to eight of the receptacle plates to be stacked to accommodate fabricated twist pins of the anticipated most-common lengths. Of course, the twist pin fabricating machine 100 (FIG. 6) and the number of receptacle plates 614 which may be stacked to create receptacles 118 may be adjusted to accommodate differences in lengths of the fabricated twist pins.

It has also been determined that each of the receptacle holes 626 are best formed by drilling. Other types of hole formation techniques, such as laser formation, are generally incapable of penetrating a sufficient depth and the sidewalls left during the formation of a hole are usually not as smooth and continuous as those sidewalls formed by drilling. Limiting the vertical thickness of each receptacle plate 614 to approximately 0.250 in. also facilitates drilling the receptacle holes 626. A shorter drill length offers a lesser risk of the drill deviating from a desired axial position, and also permits the receptacle holes 626 to be more quickly formed. Forming the large number of receptacle holes 626 economically is an important consideration in reducing the costs of the receptacle plates 614.

The pallet plate 610 is also preferably formed from an aluminum alloy material, and is shown in greater detail in FIGS. 11 and 12. A center portion 632 of the pallet plate 610 is recessed below the upper surface of the peripheral portion 624, as shown in FIG. 12. The center portion 632 is located below the receptacle area 630 of the receptacle plate 614 which rests on the upper surface 627 of the peripheral portion 624. A space 634 exists between the upper surface of the center portion 632 and a lower surface of the upward adjacent receptacle plate 614.

The space 634 permits the air flow which carries the fabricated twist pin into each receptacle 118 to vent from the bottom end of the receptacle as the twist pin enters the receptacle. Because of this venting capability, the flow of air is effective in continuing to carry the twist pin until it is completely received in each receptacle. Otherwise without the venting capability provided by the space 634, the airflow would not continue to carry the fabricated twist pin beyond some point upstream of the receptacle where the airflow had to be vented. The venting provided by the space 634 also allows the delivery nozzle 596 (FIG. 8) to be vertically positioned closely adjacent to the upper surface of the uppermost receptacle plate 614 (usually about 0.050 inches), since a space to vent the air at that location is not required. The space 634 is therefore effective to ensure that the airflow continues to carry the twist pin until it is fully received in a receptacle 118 of the cassette 116.

The space 634 also permits in recessing the upper ends of the fabricated twist pins in the receptacle 118 slightly below the upper surface 620 of the upper receptacle plate 614*a*, if the vertical height of the stack of receptacle plates is equal to the length of the fabricated twist pin. Consequently, any slight variation in length of the fabricated twist pins does not result in an end 70 or 74 (FIG. 1) protruding above the upper surface 620 of the upper receptacle plate 614*a*. This permits a cover 636 to be attached to the upper receptacle plate 614*a*, as is understood from FIGS. 10–12.

The cover 636 is attached to the upper receptacle plate 614*a* by thumb screws 638. Holes 640 are formed in the cover 636 through which a threaded shaft 642 of each thumb screw 638 extends. The threaded holes 641 are formed in the upper surface 620 of the upper receptacle plate 614*a*, preferably in a position in alignment with the registration holes 616. The threaded shaft 642 of each thumb screw 638 is threaded into the threaded hole 641 to hold the cover 636 in place on top of the upper surface 620 of the upper receptacle plate 614*a*. Placing the cover 630 on top of the assembled stack of receptacle plates 614 prevents dust and other foreign material from entering into the receptacles 118 and contacting the fabricated twist pins while the twist pins are stored prior to use. When it is desired to unload the twist pins from the cassette 116, the cover 630 is removed by removing the thumb screws 638. The cover 630 is also removed during heat treatment of the twist pins contained in the cassette 116.

The receptacle plates 614*a* and 614 are held in the stacked relationship, and the receptacle plates are retained to the pallet plate 610 by screws 644 which extend through holes 646 formed in the ends of the stacked receptacle plates 614, as shown in FIGS. 11 and 12. The screws 644 are threaded into holes 648 formed in the peripheral portion 624 of the pallet plate 610. The heads of the screws 644 do not protrude above the upper surface 620 of the upper receptacle plate 614*a* because the hole 646 in the upper receptacle plate 614*a* is countersunk. Consequently the heads of the screws 644 do not interfere with the closure of the cover 636 on top of the upper receptacle plate 614*a* to trap the fabricated twist pins in the receptacles 118.

In some circumstances, it might be desirable to heat treat the fabricated twist pins. Heat treating may induce desirable mechanical characteristics in the beryllium copper or other metal from which the twist pins are formed. By fabricating the pallet plates 610 and the receptacle plates 614*a* and 614 from an aluminum metal or ceramic material, the twist pins may be treated while they are retained in the cassette 116. The cassette 116 with loaded twist pins is placed in an oven where the heat treatment occurs.

Figure 13:
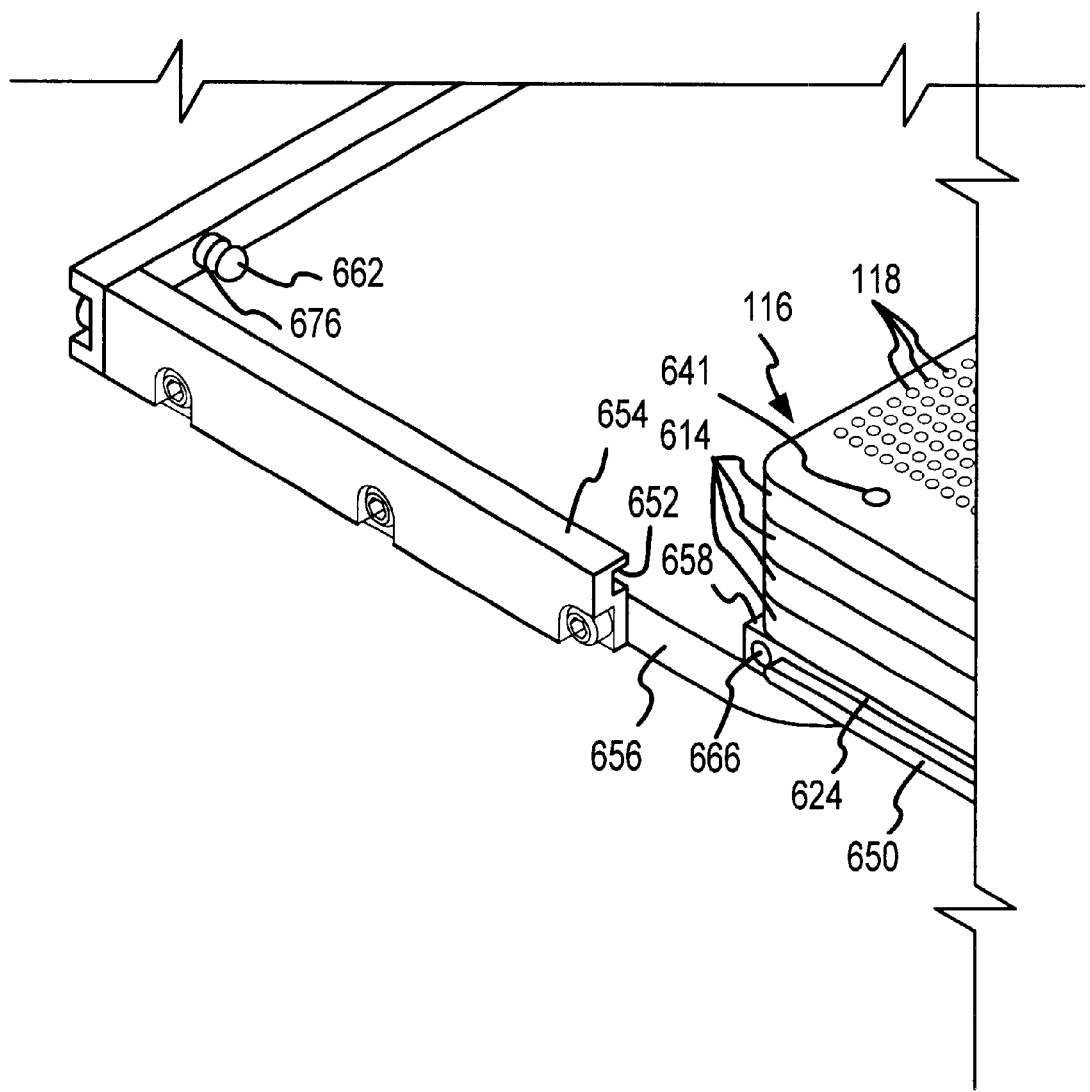
FIG. 13 is a perspective view of a portion of the cassette shown in FIGS. 10–12 and of a portion of an x-y movement table of the twist pin receiving mechanism shown in FIG. 6.

For the x-y movement table 120 to position the receptacles 118 precisely below the delivery nozzle 596 of the delivery tube assembly 542 (FIG. 7), the cassette 116 must be in a fixed and predetermined location on an upper platform 656 of the x-y movement table 120, as shown in FIGS. 6, 12 and 13. To assist in fixing the cassette 116 in position, guide rails 650 are attached to each side of the pallet plate 610. The guide rails 650 extend outwardly from the peripheral portions 624 of the pallet plate 650 and extend generally parallel along an edge of the peripheral portions 624, as shown in FIGS. 12 and 13. The guide rails 650 slide into correspondingly-shaped guide slots 652 which are formed in receivers 654. As shown in FIGS. 6 and 13, the receivers 654 are attached on opposite lateral sides of the upper platform 656 of the x-y movement table 120. The receivers 654 are spaced apart on the platform 656 by a slight tolerance greater than the width of the pallet plate 610 between the opposite outside edges of its peripheral portions 624 (FIGS. 10 and 11).

The location of the receivers 654 and the receipt of the guide rails 650 in the guide slots 652 confine the cassette 116 against lateral movement in the plane of the upper platform 656 in a direction perpendicular to the extension of the guide rails 650 and guide slots 652. The receipt of the guide rails 650 in the guide slots 652 further locates the cassette 116 in a predetermined height relationship relative to the upper platform 656, to confine the cassette against movement in a vertical direction perpendicular to the plane of the upper platform 656. Confining the cassette 116 in a vertical direction relative to the plane of the upper platform 656 assures that the upper surface of the receptacle area 630 (FIG. 10) will be coplanar with the plane of the upper platform 656. Such a coplanar relationship avoids the necessity to continually adjust the vertical height of the delivery nozzle 596 (FIG. 8) as the x-y movement table 120 positions each unoccupied receptacle 118 for the receipt of a fabricated twist pin. A planar relationship of the upper surface of the upper receptacle plate 614a is achieved by making the vertical height dimension of each of the receptacle plates 614a and 614 uniform across each receptacle plate, and preferably the same for each receptacle plate 614a and 614.

To confine the cassette 116 against movement relative to the upper platform 656 in a direction parallel to the guide rails 650, a rear edge 658 (FIG. 13) of the pallet plate 610 includes a registration hole 660 (FIG. 12) into which a registration pin 662 (FIG. 13) is received when the cassette 116 is locked in its final, fixed position on the upper platform 656. A conventional ball plunger device 664 is located in a threaded hole 666 which extends into the pallet plate 610 from a vertical edge adjoining the peripheral portion 624, as shown in FIGS. 12 and 13. The ball plunger device 664 (FIG. 12) comprises a threaded body 668 into which a center hole 670 has been formed. A spring 672 is located in the center hole 670 and biases a ball 674 outward from the center hole 670. A portion of the threaded body 668 adjacent to the opening end of the hole 670 is deformed after the ball 674 has been inserted in the hole 670, to prevent the ball 674 from escaping from the hole 670. The bias of the spring 672 causes the ball 674 to protrude slightly from the end of the threaded body 668, but inward force applied to the ball 674 will cause it to retract into the hole 670 against the bias force from the spring 672.

The ball plunger device 664 extends perpendicularly into the registration hole 660 to locate the ball 674 in position to snap into a groove 676 formed in the end of the registration pin 662, as shown in FIG. 13. With the ball 674 in the groove 676, the pallet plate 610 is firmly and stationarily connected to the upper platform 656, and the cassette 116 will not move along the platform 656 in a direction parallel to the receivers 654. However, the application manual force on the handle 612 of the pallet plate 610 will cause the ball 674 to retract into the center hole 670 and out of the groove 676 of the registration pin 662 to allow the cassette 116 to be pulled forward in a direction parallel to the guide slots 652 and guide rails 670. In this manner, the cassette 116 can be both confined in a fixed location relative to the upper platform 656 and can be removed from the upper platform 656 when desired.

In addition to the upper platform 656, the x-y movement table 120 includes an actuator mechanism 680 which moves the platform 656 in the front and back directions relative to the machine 100, as shown in FIG. 6. The front and back direction is the direction parallel to the guide rails 650 and the guide slots 652 when the cassette is confined to the x-y movement table 120. The front-back actuator mechanism 680 is conventional, and includes an electric motor 682 which is controlled by the machine controller (not shown) to move the platform 656 in the front and back directions. To achieve movement in the transverse lateral direction, the x-y movement table 120 includes another conventional actuator mechanism 684. The lateral actuator mechanism is attached to and supports front-back actuator mechanism 680, and causes the entire front-back actuator mechanism 680 with its attached upper platform 656 to move in a direction perpendicular to the front-back direction of movement of the actuator mechanisms 680. The lateral actuator mechanism 680 includes an electric motor 686 which causes the movement of the lateral actuator mechanism 680 relative to the stationary frame elements 126.

The electric motors 682 and 686 are preferably stepper motors with a high degree of resolution augmented by the mechanical elements of the actuator mechanism 680 and 684 driven by the motors 682 and 686, respectively. Consequently, a high degree of precision in both horizontal dimensions is available from the x-y movement table 120. This high degree of precision allows each receptacle 118 of the cassette 116 to be placed directly below the delivery nozzle 596 of the delivery tube assembly 542, to transfer a fabricated twist pin into an unoccupied receptacle. As each receptacle is filled with a fabricated twist pin, the machine controller (not shown) energizes the stepper motors 682 and 686 appropriately to position the next unoccupied receptacle 118 below the delivery nozzle 596 to receive the next fabricated twist pin. The controller moves the x-y table 120 at a predetermined time after the sensor 598 (FIG. 8) signals that a fabricated twist pin has passed through the delivery nozzle 596. A predetermined time delay is permitted after the twist pin passes the sensor 598 (FIG. 8) to allow sufficient time for the twist pin to occupy the receptacle 118, before the motors 682 and 686 of the x-y table 120 are activated. The movement of the x-y movement table 120 is completed prior to the time that another twist pin has been severed by the laser beam of the laser beam device 110.

Figure 14:
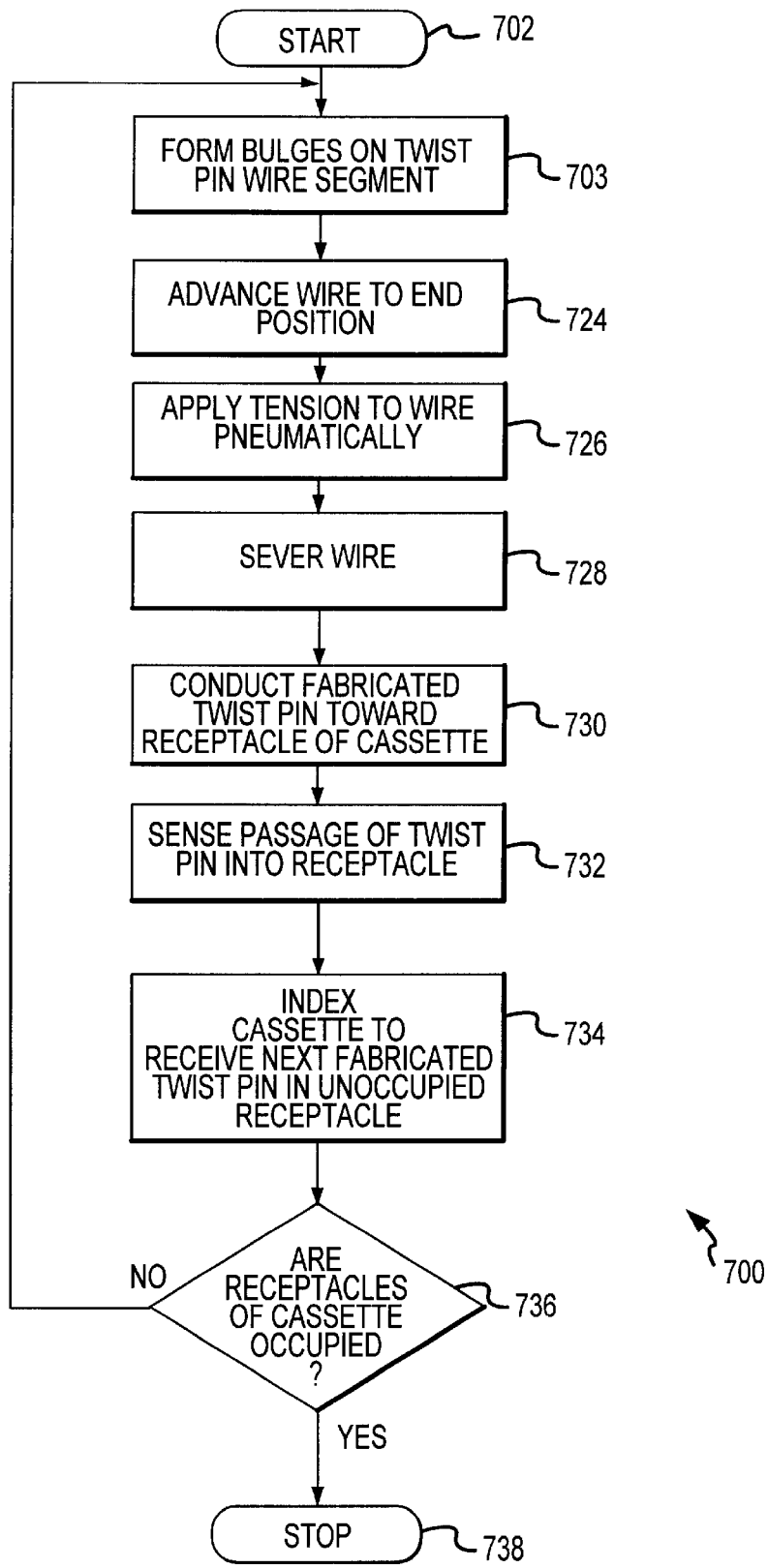
FIG. 14 is a flowchart of the basic methodology of applying tension to a segment of wire containing a fabricated twist pin, conducting the fabricated twist pin into a receptacle of a cassette after severing the wire segment, and moving the cassette to present an unoccupied receptacle for receiving the next fabricated twist pin, in accordance with the present invention and the functions performed by the inductor mechanism and the twist pin receiving mechanism of the twist pin fabricating machine shown in FIGS. 6 and 7.

The manner in which the above-described inductor mechanism 108 and twist pin receiving mechanism 114 cooperatively function in the twist pin fabricating machine 100, and the general method of conveying and delivering twist pins according to the present invention, is illustrated by a process flow shown at 700 in FIG. 14. The separate operations of the machine and the steps of the method in the process flow 700 are referenced by separate reference numbers. The process flow 700 presumes normal functionality without consideration of error or malfunction conditions.

The process flow 700 begins at step 702. At step 703, all of the bulges on a twist pin have been formed as a result of the wire feed mechanism 104 and the bold forming mechanism 106 (FIGS. 6 and 7) advancing the wire and forming the bulges at the predetermined intervals. The wire is advanced at step 724 to position the wire at a location where ends 70 and 74 (FIG. 1) of the twist pin 50 are to be formed. The position of the wire established at step 724 locates the ends 70 and 74 where the laser beam from the laser device 110 (FIGS. 6 and 7) will melt the wire to sever the fabricated twist pin and form the ends 70 and 74.

However, before severing the wire, gas is delivered to the venturi assembly 540 (FIG. 9), and the resulting low-pressure surrounding the wire within the center bore 560 (FIG. 9) pneumatically induces tension in the wire, as shown at step 726. The tension induced by the venturi assembly is resisted by the spindle 200 and the idler roller 220 of the wire feed mechanism 104 (FIG. 7) which are non-rotational at this time. The stationary gripping assembly should also be closed in a step (not shown) executed between steps 724 and 726, to cause the tension applied at step 726 to be resisted by the stationary gripping assembly.

After the tension has been applied pneumatically to the wire at step 726, the laser beam device 110 (FIG. 7) is actuated and the laser beam melts the wire at the end positions to sever the fabricated twist pin from the wire, as shown at step 728. The air flow from the venturi assembly through the delivery tube assembly 542 (FIG. 8) conducts the severed and fabricated twist pin toward the cassette as shown at step 730.

As shown at step 732, the twist pin is sensed as passing into the delivery nozzle 596 of the delivery tube assembly 542 (FIG. 8). The sensing at step 732 is accomplished by the sensor 598 (FIG. 8). Sensing the passage of the fabricated twist pin from the delivery nozzle 596 ceases the delivery of air flow to the venturi assembly 540. Terminating the air flow to the venturi assembly also terminates the flow of air through the delivery tube assembly 542 (FIG. 8) which carried the fabricated twist pin to the delivery nozzle 596. Sensing the fabricated twist pin at step 732 also causes the x-y movement table 120 to move or index into a position in which an unoccupied receptacle 118 (FIG. 12) is located below the delivery nozzle 596. The step of indexing the cassette is illustrated at 734, and is typically executed after predetermined time delay after passage of the twist pin passage has been sensed at step 732.

Next, as shown at step 736, a determination is made as to whether all of the receptacles 118 of the cassette 116 (FIGS. 6, 10, 12) are fully occupied by fabricated twist pins. The determination made at step 736 is accomplished by first knowing the number of available receptacles in the cassette, and then counting the number of fabricated twist pins which are delivered as a result of sensing step at 732.

Until all of the receptacles of the cassette have been fully occupied, twist pins will continue to be fabricated and delivered to the cassette, as a result of the program flow looping from step 736 back to step 703. The execution of the steps between 703 and 736 results in fabricating an twist pin and conveying that fabricated twist pin into a receptacle of the cartridge. Once all the receptacles of the cassette have been occupied, the program flow 700 stops at step 738. Then, the operator may thereafter remove the full cassette 116, cover it with the cover 636 (FIGS. 10–12) and insert a new cassette with unoccupied receptacles onto the x-y movement table 120 (FIG. 6) to continue the process flow 700 by starting over at step 702.

The improvements are numerous and significant compared to the prior art. The more precisely fabricated twist pins are conveniently severed from the wire as a result of the slight tension force induced pneumatically by the venturi assembly as the laser beam severs the wire. The delivery tube assembly readily conveys the fabricated twist pins through the delivery nozzle. The sensor recognizes the passage of twist pin and prevents further machine operation should an inadvertent jam or other problem occur.

The precise positional relationships and configurations of the receptacles and the characteristics of the cassette allow the x-y movement table to precisely position unoccupied receptacles to receive the fabricated twist pins. The x-y movement table moves an unoccupied receptacle into position for the receipt of the fabricated twist pin as rapidly as a new twist pin is fabricated. The movement of the fabricated twist pins occurs without manual contact of the pins, which might bend or damage the twist pins. The gas flow through the delivery tube assembly carries the fabricated twist pins completely into the receptacles of the cassette, because the space beneath the receptacles 118 provides relief for the gas flow out of the receptacle as the fabricated twist pin is delivered into the receptacle. The cassettes provide a convenient arrangement for storing the fabricated twist pins, for holding the fabricated twist pins during further processing, such as heat treatment, and making the twist pins conveniently available for removal and insertion when the modules are formed.

The present invention results in more efficient fabrication twist pins by avoiding the additional steps and inefficiencies typical of the prior art. The present invention avoids altogether delivering the fabricated twist pins into the random pile or "haystack." Consequently, there is no necessity for sorting and singulating the twist pins as a separate production step. Moreover, the risk of damage to the fabricated twist pin and the need for human intervention to convey the twist pins into the sorting and singulating machine is entirely avoided. The higher production efficiency resulting from the present invention facilitates a greater twist pin fabrication rate.

A presently preferred embodiment of the invention and many of its improvements have been described with a degree of particularity. This description is of a preferred example of implementing the invention and is not necessarily intended to limit the scope of the invention. The scope of the invention is defined by the following claims.

The invention claimed is:

1. A mechanism for conveying a segment of wire from which an electrical connector has been fabricated from a point where the electrical connector wire segment is severed from a length of remaining wire into a receptacle within which the electrical connector wire segment is stored until use, comprising:

a pneumatic inductor mechanism into which the wire segment is received, the pneumatic inductor including a venturi assembly and the delivery tube assembly connected to the venturi assembly, the venturi assembly responding to gas supplied to the venturi assembly from a source to develop a reduced pressure applied to the wire segment received in the pneumatic inductor and to create a gas flow through the delivery tube assembly having a sufficient magnitude to convey the wire segment; and a wire segment receiving mechanism including a cassette and a movement device to which the cassette is connected, the cassette having a plurality of receptacles located at predetermined positions within which to receive the wire segments, the movement device including an movement actuator to move the movement device and the connected cassette to position each receptacle to receive a wire segment conveyed by the gas flow through the delivery tube assembly.

2. A mechanism as defined in claim 1 wherein:
the venturi assembly is positioned stationarily;
the distance between the venturi assembly and each receptacle is variable between cassettes having different lengths of receptacles;
the length of the delivery tube assembly is adjustable.

3. A mechanism as defined in claim 1 wherein:
the delivery tube assembly includes a movable tube; and further comprising:
  a carrier device connected to the delivery tube and selectively movable in a direction generally parallel to the delivery tube; and
  a carrier actuator connected to the carrier device for selectively moving the carrier device and the connected delivery tube relative to the cassette.

4. A mechanism as defined in claim 3 wherein:
the delivery tube assembly further includes a delivery nozzle through which the wire segments are conducted into the receptacles;
the delivery nozzle is connected to the delivery tube; and
the carrier actuator moves the carrier device, the delivery tube connected to the carrier device and the delivery nozzle connected to the delivery tube.

5. A mechanism as defined in claim 4 wherein:
the cassette is removably connected to the movement device; and
the carrier actuator withdraws the delivery nozzle a sufficient distance from the cassette to avoid contacting the cassette when the cassette is removed from the movement device.

6. A mechanism as defined in claim 5 further comprising:
a sensor located between the delivery tube and the delivery nozzle to sense the passage of a wire segment into the delivery nozzle.

7. A mechanism as defined in claim 6 wherein:
the sensor is an optical sensor; and
the delivery nozzle is fabricated from light transmissive material.

8. A mechanism as defined in claim 1 wherein:
the venturi assembly is positioned stationarily;
the delivery tube assembly includes first and second delivery tubes having portions which are telescopically received within one another;
the first delivery tube is connected to the stationary venturi assembly;
and a second delivery tube connected to the carrier; and further comprising:
a support arm connected to the second delivery tube.

9. A mechanism as defined in claim 8 further comprising:
a delivery nozzle connected to the end of the second delivery tube opposite the portion which is telescopically received in the first delivery tube; and wherein:
the support arm includes an adjustable connection to connect the second delivery tube along its length.

10. A mechanism as defined in claim 9 wherein:
the adjustable connection of the support arm positions the delivery nozzle immediately above the receptacles in the cassette.

11. A mechanism as defined in claim 10 wherein:
the cassette includes a generally planar upper surface into which the receptacles are formed; and
the cassette is connected to the movement device to maintain the upper surface in a plane as the movement device moves the cassette.

12. A mechanism as defined in claim 10 wherein:
the cassette is removably connected to the movement device; and further comprising:
  a carrier device connected to the support arm and selectively movable in a direction generally parallel to the second delivery tube; and
  a carrier actuator connected to the carrier device for selectively moving the carrier device, the support arm and the connected second delivery tube a sufficient distance from the cassette to avoid contacting the delivery nozzle with the cassette when the cassette is removed from the movement device.

13. A mechanism as defined in claim 1 wherein:
the cassette is removably connected to the movement device.

14. A mechanism as defined in claim 1 wherein:
each receptacle of the cassette is vented to conduct the gas flow from the delivery tube through the receptacle.

15. A mechanism as defined in claim 1 wherein the cassette further comprises:
pallet plate;
at least one cassette registration device connected to the pallet plate;
at least one receptacle plate connected to the pallet plate, each receptacle plate including a plurality of receptacle holes located at predetermined positions which define each receptacle of the cassette;
the pallet plate and the one receptacle plate each include at least one plate registration device which interacts with the plate registration device of the other one of the pallet plate or the receptacle plate to form an interactive plate registration assembly between the pallet plate and the receptacle plate to locate the receptacle plate and the plurality of receptacle holes at a predetermined positions related to the pallet plate; and
the movement device further includes a cassette registration device which interacts with the cassette registration device of the pallet plate to form an interactive cassette registration assembly between the pallet plate and the movement table to locate the receptacle plate and the plurality of receptacle holes at a predetermined positions related to the pallet plate.

16. A mechanism as defined in claim 15 wherein:
the delivery tube assembly includes a delivery nozzle positioned in a predetermined stationary location and through which the wire segments are conducted; and
the movement actuator moves the movement device and the connected pallet plate and the registered receptacle plate to position the receptacle holes directly below the delivery nozzle by which to conduct the wire segment and the gas flow from the delivery nozzle into the receptacle hole.

17. A mechanism as defined in claim 16 wherein:
the pallet plate defines the space below each receptacle hole of the receptacle plate connected to the pallet plate to vent the gas flow out of the receptacle hole.

18. A mechanism as defined in claim 15 wherein the interactive cassette registration assembly further includes:
a guide connected to the pallet plate; and
a receiver connected to the movement device and including a slot within which to receive the guide connected to the pallet plate.

19. A mechanism as defined in claim 18 wherein the interactive cassette registration assembly further includes:
- a registration hole formed in one of the movement device or the pallet;
- a registration pin formed in the other one of the movement device or the pallet at a position to fit into the registration hole when the guide is received within the slot of the receiver.

20. A mechanism as defined in claim 19 wherein the interactive cassette registration assembly further includes:
- a groove formed in the registration pin; and
- a ball plunger assembly located in the pallet plate and extending into the registration hole which receives the registration pin, the ball plunger including a ball biased to enter the groove of the registration pin when the cassette is located in the predetermined position on the movement device.

21. A mechanism as defined in claim 15 further comprising:
- an additional receptacle plate connected to the one receptacle plate connected to the pallet plate, each additional receptacle plate including a plurality of receptacle holes located at the same predetermined positions where the receptacle holes of the one receptacle plate are located, the receptacle holes of the additional receptacle plate continuing the receptacle holes of the one receptacle plate to collectively define each receptacle of the cassette;
- the one receptacle plate and the additional receptacle plate each include at least one plate registration device which interacts with the plate registration device of the other one of the receptacle plate to form an interactive plate registration assembly between the receptacle plates to locate the receptacle plate and the plurality of receptacle holes at a predetermined positions related to the pallet plate.

22. A mechanism as defined in claim 21 wherein each interactive plate registration assembly includes a registration hole within which a registration pin slip fits.

23. A mechanism as defined in claim 21 wherein the cassette further includes:
- an upper generally planar surface of an upper receptacle plate spaced the greatest distance from the pallet plate, the receptacle holes of the uppermost receptacle plate extending from the planar surface toward the pallet plate; and
- a cover which is selectively connected to the upper surface of the upper receptacle plate and which covers all of the receptacle holes of the upper plate.

24. A mechanism as defined in claim 15 wherein the delivery tube assembly includes:
- a delivery nozzle positioned in a predetermined stationary location and through which the wire segments are conducted; and the cassette further includes:
  - an upper generally planar surface of an upper receptacle plate spaced the greatest distance from the pallet plate, the receptacle holes of the uppermost receptacle plate extending from the planar surface toward the pallet plate; and
  - the cassette is connected to the movement device to maintain the upper surface in spaced relationship with the delivery nozzle as the movement device moves the cassette.

25. A mechanism as defined in claim 24 wherein:
- the delivery device comprises an x-y movement table having an upper platform which moves in x and y dimensions in a plane;
- the pallet plate rests on the upper platform; and
- one upper generally planar surface of an upper receptacle plate is coplanar with respect to the plane of the x and y dimensions in which the upper platform moves.

26. A mechanism as defined in claim 1 further in combination with a wire severing apparatus which severs the wire segment from the remaining length of the wire, the wire severing apparatus including a chamber into which a portion of the remaining wire and a portion of the wire segment is advanced prior to severing the wire segment, the remaining portion of the wire segment not within the chamber of the wire severing apparatus extending into the venturi assembly.

27. A mechanism as defined in claim 26 wherein the wire severing apparatus comprises a laser device for generating a laser beam to sever the wire segment by melting the wire.

28. A mechanism as defined in claim 1 wherein the electrical connector is a twist pin, the wire is formed by helically coiled strands, and the wire segment includes at least one bulge formed by uncoiling the strands in an anti-helical direction.

29. A method of conveying a segment of wire from which an electrical connector has been fabricated from a point where the electrical connector wire segment is severed from a length of remaining wire into a receptacle within which the electrical connector wire segment is stored until use, comprising the steps of:
- developing a reduced pressure applied to the wire segment;
- creating a gas flow of a sufficient magnitude to convey the wire segment; and
- positioning another receptacle to receive another wire segment conveyed by the gas flow after a previous wire segment has been conveyed into a receptacle.

30. A method as defined in claim 29 further comprising the step of:
- venting each receptacle to conduct the gas flow through the receptacle.

31. A method as defined in claim 29 further comprising the steps of:
- conveying the wire segment within the gas flow into a receptacle of a cassette having a plurality of receptacles located at predetermined positions; and
- moving the cassette after receiving the wire segment in one receptacle to position another receptacle to receive another wire segment.

32. A method as defined in claim 31 further comprising the steps of:
- sensing the passage of a wire segment into the receptacle; and
- moving the cassette after sensing the passage of a wire segment into the receptacle.

33. A method as defined in claim 32 further comprising the steps of:
- delivering the wire segments through a delivery nozzle into the receptacles;
- replacing one cassette with another cassette; and
- withdrawing the delivery nozzle a sufficient distance from the cassette to avoid contacting the cassettes during replacement.

34. A method as defined in claim 31 further comprising the steps of:
- delivering the wire segments through a delivery nozzle into the receptacles;
- maintaining a predetermined distance between the delivery nozzle and an upper surface of the cassette from which the receptacles are formed during movement of the cassette.

35. A method as defined in claim 31 further comprising the step of:
  conducting the wire segments through a delivery tube into the receptacles; and
  adjusting the position of the delivery tube relative to the receptacles.

36. A method as defined in claim 31 further comprising the step of:
  creating receptacles of a predetermined length by stacking a plurality of receptacle plates, each receptacle plate having a plurality of receptacle holes located at the same predetermined positions to define the length of each receptacle by the number of stacked receptacle plates.

37. A method as defined in claim 36 further comprising the step of:
  registering the position of the stacked receptacle plates with respect to one another to locate the plurality of receptacle holes in each receptacle plate in alignment with one another.

38. A method as defined in claim 31 further comprising the steps of:
  registering the position of the cassette on a movement device to locate the plurality of registration holes relative to a movement device; and
  moving the movement device to position the receptacles to receive the wire segments.

39. A method as defined in claim 29 further comprising the step of:
  severing the wire segment from the remaining length of the wire while applying the reduced pressure to the wire segment.

40. A method as defined in claim 39 further comprising the step of:
  severing the wire segment by melting the wire segment with a laser beam.

* * * * *